US008479231B2

(12) United States Patent
Yamamoto et al.

(10) Patent No.: US 8,479,231 B2
(45) Date of Patent: Jul. 2, 2013

(54) PROGRAM RECEIVING APPARATUS, PROGRAM TRANSMISSION/RECEPTION SYSTEM, PROGRAM RECEPTION METHOD, PROGRAM, AND RECORDING MEDIUM

(75) Inventors: Yoshiki Yamamoto, Osaka (JP); Kazutaka Nishio, Osaka (JP)

(73) Assignee: Panasonic Corporation, Osaka (JP)

( * ) Notice: Subject to any disclaimer, the term of this patent is extended or adjusted under 35 U.S.C. 154(b) by 372 days.

(21) Appl. No.: 12/741,476

(22) PCT Filed: Aug. 28, 2009

(86) PCT No.: PCT/JP2009/004218
§ 371 (c)(1),
(2), (4) Date: May 5, 2010

(87) PCT Pub. No.: WO2010/035406
PCT Pub. Date: Apr. 1, 2010

(65) Prior Publication Data
US 2010/0257562 A1 Oct. 7, 2010

(30) Foreign Application Priority Data

Sep. 29, 2008 (JP) ................................. 2008-250118

(51) Int. Cl.
*G06F 3/00* (2006.01)
*G06F 13/00* (2006.01)
*H04N 5/445* (2011.01)
(52) U.S. Cl.
USPC ................... 725/46; 725/40; 725/43; 725/47; 725/58
(58) Field of Classification Search
USPC .................................. 725/40, 43, 46–47, 58
See application file for complete search history.

(56) References Cited

U.S. PATENT DOCUMENTS

| 8,037,505 B2* | 10/2011 | Ou et al. ........................ 725/91 |
| 2004/0237108 A1* | 11/2004 | Drazin et al. ................... 725/56 |
| 2007/0157237 A1 | 7/2007 | Cordray et al. |
| 2007/0157249 A1 | 7/2007 | Cordray et al. |

(Continued)

FOREIGN PATENT DOCUMENTS

| EP | 1 104 189 A2 | 5/2001 |
| JP | 11-88280 | 3/1999 |

(Continued)

OTHER PUBLICATIONS

International Search Report issued Nov. 24, 2009 in corresponding International Application No. PCT/JP2009/004218.

*Primary Examiner* — Pankaj Kumar
*Assistant Examiner* — Charles N Hicks
(74) *Attorney, Agent, or Firm* — Wenderoth, Lind & Ponack, L.L.P.

(57) ABSTRACT

Provided is a program reception terminal that can more kindly remind the user of the existence of a forgot-to-view program. The program reception terminal comprises: a want-to-view program identifying unit 149 that identifies a want-to-view program of a viewer based on the viewing history; a not-yet-viewed program extracting unit 301 that extracts not-yet-viewed programs; a forgot-to-view program determining unit 148 that searches whether there is a want-to-view program in the not-yet-viewed programs and that determines the program found out by the searching as the forgot-to-view program; a related program determining unit 154 that determines whether a related program identified from the forgot-to-view program based on a predetermined rule exists in a program group in a predetermined period later than the predetermined time; and a program guide display control unit 144 that displays the existence of the forgot-to-view program if the related program exists.

25 Claims, 20 Drawing Sheets

U.S. PATENT DOCUMENTS

| | | |
|---|---|---|
| 2008/0031589 A1 | 2/2008 | Ariyoshi et al. |
| 2009/0094647 A1 | 4/2009 | Inoue et al. |
| 2010/0175090 A1 * | 7/2010 | Cordray .......................... 725/58 |

FOREIGN PATENT DOCUMENTS

| | | |
|---|---|---|
| JP | 2001-128076 | 5/2001 |
| JP | 2002-521874 | 7/2002 |
| JP | 2004-200882 | 7/2004 |
| JP | 2005-45627 | 2/2005 |
| JP | 2006-86819 | 3/2006 |
| JP | 2008-59351 | 3/2008 |
| WO | 00/04709 | 1/2000 |
| WO | 2007/078623 | 7/2007 |

* cited by examiner

FIG. 4 (a)

Today's Date: May 11

| May 11 | 2ch | 4ch | 6ch |
|---|---|---|---|
| 17 O'clock | Information Program A1 | Information Program B1 | Drama C1 (Eighth Episode) |
| 18 O'clock | | | Cartoon C1 (Tenth Episode) |
| 19 O'clock | News A1 | Variety B1 | Cartoon C2 (Twentieth Episode) |
| 20 O'clock | Drama A1 (Third Episode) | Variety B2 | Cartoon C3 (Fifth Episode) |
| 21 O'clock | News A2 | Drama B1 | Drama C2 (Fifth Episode) |
| 22 O'clock | Documentary A1 | Drama B2 | |
| 23 O'clock | Information Program A2 | News B2 | News C1 |

Today's Date: May 11

| May 11 | 2ch | 4ch | 6ch |
|---|---|---|---|
| 17 O'clock | Information Program A1 | Information Program B1 | Drama C1 (Eighth Episode) |
| 18 O'clock | | | Cartoon C1 (Tenth Episode) |
| 19 O'clock | News A1 | Variety B1 | Cartoon C2 (Twentieth Episode) |
| 20 O'clock | Drama A1 (Third Episode) Forgot-to-View! | Variety B2 | Cartoon C3 (Fifth Episode) |
| 21 O'clock | News A2 | Drama B1 | Drama C2 (Fifth Episode) |
| 22 O'clock | Documentary A1 | Drama B2 | |
| 23 O'clock | Information Program A2 | News B2 | News C1 |

Today's Date: May 11

| May 11 | 2ch | 4ch | 6ch |
|---|---|---|---|
| 17 O'clock | Information Program A1 | Information Program B1 | Drama C1 (Eighth Episode) |
| 18 O'clock | | | Cartoon C1 (Tenth Episode) |
| 19 O'clock | News A1 | Variety B1 | Cartoon C2 (Twentieth Episode) |
| 20 O'clock | Drama A1 (Third Episode) *Forgot-to-View!* | Variety B2 | Cartoon C3 (Fifth Episode) |
| 21 O'clock | News A2 | Drama B1 | Drama C2 (Fifth Episode) |
| 22 O'clock | Documentary A1 | Drama B2 | |
| 23 O'clock | Information Program A2 | News B2 | News C1 |

FIG. 5 (b)

Today's Date: May 11

| May 11 | 2ch | 4ch | 6ch |
|---|---|---|---|
| 17 O'clock | Information Program A1 | Information Program B1 | Drama C1 (Eighth Episode) |
| 18 O'clock | | | Cartoon C1 (Tenth Episode) |
| 19 O'clock | News A1 *Forgot-to-View!* | Variety B1 | Cartoon C2 (Twentieth Episode) |
| 20 O'clock | Drama A1 (Third Episode) | Variety B2 | Cartoon C3 (Fifth Episode) |
| 21 O'clock | News A2 | Drama B1 | Drama C2 (Fifth Episode) |
| 22 O'clock | Documentary A1 | Drama B2 | |
| 23 O'clock | Information Program A2 | News B2 | News C1 |

FIG. 7 (a)

Today's Date: May 11, Before 19 O'clock    611          610

| May 11 | 2ch | 4ch | 6ch |
|---|---|---|---|
| 17 O'clock | Information Program A1 | Information Program B1 | Drama C1 (Eighth Episode) |
| 18 O'clock | | | Cartoon C1 (Tenth Episode) |
| 19 O'clock | News A1 (Forgot-to-View!) | Variety B1 | Cartoon C2 (Twentieth Episode) |
| 20 O'clock | Drama A1 (Third Episode) | Variety B2 | Cartoon C3 (Fifth Episode) |
| 21 O'clock | News A2 | Drama B1 | Drama C2 (Fifth Episode) |
| 22 O'clock | Documentary A1 | Drama B2 | |
| 23 O'clock | Information Program A2 | News B2 | News C1 |

FIG. 7 (b)

Today's Date: May 11, After 19 O'clock    601          600

| May 11 | 2ch | 4ch | 6ch |
|---|---|---|---|
| 17 O'clock | Information Program A1 | Information Program B1 | Drama C1 (Eighth Episode) |
| 18 O'clock | | | Cartoon C1 (Tenth Episode) |
| 19 O'clock | News A1 | Variety B1 | Cartoon C2 (Twentieth Episode) |
| 20 O'clock | Drama A1 (Third Episode) (Forgot-to-View!) | Variety B2 | Cartoon C3 (Fifth Episode) |
| 21 O'clock | News A2 | Drama B1 | Drama C2 (Fifth Episode) |
| 22 O'clock | Documentary A1 | Drama B2 | |
| 23 O'clock | Information Program A2 | News B2 | News C1 |

FIG. 8

Today's Date: May 11

| May 11 | 2ch | 4ch | 6ch |
|---|---|---|---|
| 17 O'clock | Information Program A1 | Information Program B1 | Drama C1 (Eighth Episode) |
| 18 O'clock | | | CartoonC1 (Tenth Episode) |
| 19 O'clock | News A1 — Forgot-to-View! | Variety B1 | CartoonC2 (Twentieth Episode) |
| 20 O'clock | Drama A1 (Third Episode) | Variety B2 | CartoonC3 (Fifth Episode) |
| 21 O'clock | News A2 | Drama B1 | Drama C2 (Fifth Episode) |
| 22 O'clock | Documentary A1 | Drama B2 | |
| 23 O'clock | Information Program A2 | News B2 | News C1 |

FIG. 9

Today's Date: May 11 /711                                                710

| May 11 | 2ch | 4ch | 6ch |
|---|---|---|---|
| 17 O'clock | Information Program A1 | Information Program B1 | Drama C1 (Eighth Episode) |
| 18 O'clock | | | Cartoon C1 (Tenth Episode) |
| 19 O'clock (Forgot-to-View!) | News A1 | Variety B1 | Cartoon C2 (Twentieth Episode) |
| 20 O'clock | Drama A1 (Third Episode) | Variety B2 | Cartoon C3 (Fifth Episode) |
| 21 O'clock | News A2 | Drama B1 | Drama C2 (Fifth Episode) |
| 22 O'clock | Documentary A1 | Drama B2 | |
| 23 O'clock | Information Program A2 | News B2 | News C1 |

FIG. 13 (a)

| May 11 | 2ch | 4ch | 6ch |
|---|---|---|---|
| 17 O'clock | Information Program A1 | Baseball Broadcasting | Drama C1 (Eighth Episode) |
| 18 O'clock | | | Cartoon C1 (Tenth Episode) |
| 19 O'clock | News A1 | Variety B1 | Cartoon C2 (Twentieth Episode) |
| 20 O'clock | Drama A1 (Third Episode) | Variety B2 (Forgot-to-View!) | Cartoon C3 (Fifth Episode) |
| 21 O'clock | News A2 | Drama B1 (Fourth Episode) | Drama C2 (Fifth Episode) |
| 22 O'clock | Documentary A1 | Drama B2 | |
| 23 O'clock | Information Program A2 | News B2 | News C1 |

FIG. 13 (b)

| May 11 | 2ch | 4ch | 6ch |
|---|---|---|---|
| 17 O'clock | Information Program A1 | Baseball Broadcasting | Drama C1 (Eighth Episode) |
| 18 O'clock | | | Cartoon C1 (Tenth Episode) |
| 19 O'clock | News A1 | | Cartoon C2 (Twentieth Episode) |
| 20 O'clock | Drama A1 (Third Episode) | Variety B1 | Cartoon C3 (Fifth Episode) |
| 21 O'clock | News A2 | Variety B2 (Forgot-to-View!) | Drama C2 (Fifth Episode) |
| 22 O'clock | Documentary A1 | Drama B1 (Fourth Episode) | |
| 23 O'clock | Information Program A2 | Drama B2 | News C1 |

FIG. 14 (a)

| May 11 | 2ch | 4ch | 6ch |
|---|---|---|---|
| 17 O'clock | Information Program A1 | Information Program B1 | Drama C1 (Eighth Episode) |
| 18 O'clock | | | Cartoon C1 (Tenth Episode) |
| 19 O'clock | News A1 | Variety B1 (Forgot-to-View!) | Cartoon C2 (Twentieth Episode) |
| 20 O'clock | Drama A1 (Third Episode) | Variety B2 | Cartoon C3 (Fifth Episode) |
| 21 O'clock | News A2 | Drama B1 (Fourth Episode) | Drama C2 (Fifth Episode) |
| 22 O'clock | Documentary A1 | Drama B2 | |
| 23 O'clock | Information Program A2 | News B2 | News C1 |

FIG. 14 (b)

| May 11 | 2ch | 4ch | 6ch |
|---|---|---|---|
| 17 O'clock | Information Program A1 | Information Program B1 | Drama C1 (Eighth Episode) |
| 18 O'clock | | | Cartoon C1 (Tenth Episode) |
| 19 O'clock | News A1 | Variety B1 | Cartoon C2 (Twentieth Episode) |
| 20 O'clock | Drama A1 (Third Episode) | Variety B2 (Forgot-to-View!) | Cartoon C3 (Fifth Episode) |
| 21 O'clock | News A2 | Drama B1 (Fourth Episode) | Drama C2 (Fifth Episode) |
| 22 O'clock | Documentary A1 | Drama B2 | |
| 23 O'clock | Information Program A2 | News B2 | News C1 |

FIG.14 (c)

| May 11 | 2ch | 4ch | 6ch |
|---|---|---|---|
| 17 O'clock | Information Program A1 | Information Program B1 | Drama C1 (Eighth Episode) |
| 18 O'clock | | | Cartoon C1 (Tenth Episode) |
| 19 O'clock | News A1 | Variety B1 | Cartoon C2 (Twentieth Episode) |
| 20 O'clock | Drama A1 (Third Episode) | Variety B2 | Cartoon C3 (Fifth Episode) |
| 21 O'clock | News A2 | Drama B1 (Fourth Episode) — Forgot-to-View! | Drama C2 (Fifth Episode) |
| 22 O'clock | Documentary A1 | Drama B2 | |
| 23 O'clock | Information Program A2 | News B2 | News C1 |

1221  1220

US 8,479,231 B2

PROGRAM RECEIVING APPARATUS, PROGRAM TRANSMISSION/RECEPTION SYSTEM, PROGRAM RECEPTION METHOD, PROGRAM, AND RECORDING MEDIUM

CROSS-REFERENCE TO RELATED APPLICATIONS

This application is a U.S. national phase application of PCT International Patent Application No. PCT/JP2009/004218 filed Aug. 28, 2009, claiming the benefit of priority of Japanese Patent Application No. 2008-250118 filed Sep. 29, 2008, all of which are incorporated by reference herein in their entirety.

TECHNICAL FIELD

The present invention relates to a program receiving apparatus that receives a forgot-to-view program, a program transmission/reception system, and the like.

BACKGROUND ART

In recent years, in order for a user to later view a program that the user forgot to view or record (forgot-to-view program), a mechanism (forgot-to-view program distribution), in which a TV station or the like installs a server that stores broadcasted programs and distributes the programs to the user through the Internet or the like, has been studied and attempted.

An example of a known method for receiving a program that a viewer forgot to view includes a system in which when the viewer designates a program that the viewer forgot to view, rebroadcast of the program is automatically searched, and the viewer receives the rebroadcast.

Hereinafter, a conventional reception method of a forgot-to-view program described, for example, in Japanese Patent Laid-Open No. 2004-200882 will be described.

FIG. 19 is a diagram showing an embodiment of a network configuration applicable to a rebroadcasting program recording designation system of a conventional invention. As shown in FIG. 19, the rebroadcasting program recording designation system comprises: a cell phone 810 of a registered user; a communication provider-side apparatus 820 that intermediates transfer of data between the cell phone 810 and Internet 860; a service center 830 managed by a service provider that performs services such as an individual broadcasting program guide service (hereinafter, also called a broadcasting program guide service provider); TV broadcasting stations 840 (a plurality of); a home 850 of the registered user comprising a recording apparatus 851, a TV receiver 852, and the like; and the Internet 860 that connects the cell phone 810, the communication provider-side apparatus 820, the service center 830, the home 850 of the registered user, and the like.

The communication provider-side apparatus 820 comprises a base station 821 and a mobile communication control station 822.

Furthermore, the provider of services, such as a broadcasting program guide service, obtains program guide data of each channel from the plurality of TV broadcasting stations 840 and periodically, or on an as needed basis, registers the program guide data in a database 832 of the service center 830.

The registered user activates the cell phone 810 to connect the cell phone 810 with a broadcasting program guide service server 831 of the service center 830 through the communication provider-side apparatus 820 and the Internet 860. Then, the registered user selects a "Rebroadcasting Program Recording Instruction" menu in a selection menu displayed, immediately after the connection, on the screen of the cell phone 810 and selects the date and channel that the forgot-to-view program is broadcasted.

Next, when the user designates a forgot-to-view program from a plurality of past programs in the designated date and designated channel displayed on the cell phone 810, the cell phone (cell phone of rebroadcasting program designation request source) 810 transmits identification information of the designated forgot-to-view program to the service center 830 through the communication provider-side apparatus 820 and the Internet 860. The method of designation is an example, and a program name may be directly designated.

When the identification information of the forgot-to-view program is received from the cell phone 810, the broadcasting program guide service server 831 of the service center 830 searches the program guide data registered in the database 832, and if there is a rebroadcasting program, transmits the program information to the cell phone 810 of the rebroadcasting program recording request source. An example of the search method of rebroadcasting program data includes a method of searching program databases of TV broadcasting stations or program databases provided from the TV broadcasting stations, or rebroadcasting date/time information may be attached to the program information. When one program of cable TV or the like is repeatedly broadcasted for a number of times, a comparison chart of program name and broadcasting date/time is often prepared.

The cell phone 810 of the rebroadcasting program recording request source displays the received rebroadcasting program information, and when the user performs a recording instruction operation, transmits a recording instruction to the broadcasting program guide service server 831.

As a result, the broadcasting program guide service server 831 transmits a recording reservation setting instruction including the rebroadcasting program information (such as broadcasting time and channel information of the rebroadcasting program) to the recording apparatus 851 of the user of the cell phone 810 of the rebroadcasting program recording request source through the Internet 860.

When the broadcasting time comes, the recording apparatus 851 of the user of the cell phone 810 of the rebroadcasting program reservation request source receives a rebroadcasting program to be broadcasted from the TV broadcasting station 840 of the reserved channel and records the rebroadcasting program in an installed recording medium.

Furthermore, as a trigger for viewing a forgot-to-view program, other than when the user notices and views the program, there is a system of displaying a reminder on a local two-way TV program guide indicating that the user has missed viewing a pay-per-view program, when there is a program that the user has forgot to view, in a pay-per-view system in which the user pays viewing fees for the amount of viewing (National Publication of International Patent Application No. 2002-521874).

SUMMARY OF INVENTION

Technical Problem

However, as described, the rebroadcast of the program that the user forgot to view is searched at the time of the designation by the user in the conventional viewing method of forgot-to-view program of (Japanese Patent Laid-Open No. 2004-

200882), and there is a problem that viewing the program remains forgotten forever unless the user intentionally searches the program.

Furthermore, the fact that the user has missed viewing the program is just notified in the conventional reminder system of (National Publication of International Patent Application No. 2002-521874). There is no more refinement for the user, and there is a problem that the user remains not viewing the program after all.

The present invention solves the problems in the conventional viewing techniques and provides a program reception terminal, a program transmission/reception system, and the like, in which the user does not particularly have to intentionally perform searching, and the user can naturally recognize a forgot-to-view program in a daily act of viewing TV broadcasting or TV guide.

The 1$^{st}$ aspect of the present invention is a program reception terminal comprising:
 a receiving unit that receives programs for viewing;
 a history creating unit that creates a viewing history based on viewed programs;
 a history storing unit that stores the created viewing history;
 a want-to-view program identifying unit that identifies a want-to-view program of a viewer based on the viewing history;
 a forgot-to-view program identifying unit that identifies a forgot-to-view program based on the want-to-view program and a result of a determination of viewing or not-yet-viewing until a predetermined time;
 a related program determining unit that determines whether a related program identified from the forgot-to-view program based on a predetermined rule exists in a program group in a predetermined period later than the predetermined time; and
 a forgot-to-view display control unit that displays the existence of the forgot-to-view program if the related program exists.

The 2$^{nd}$ aspect of the present invention is the program reception terminal according to the 1$^{st}$ aspect of the present invention, wherein
 if a system that distributes programs cannot distribute the forgot-to-view program, the forgot-to-view display control unit does not display the existence of the forgot-to-view program.

The 3$^{rd}$ aspect of the present invention is the program reception terminal according to the 1$^{st}$ aspect of the present invention, wherein
 if the system that distributes programs cannot distribute the want-to-view program, all or part of operations of the forgot-to-view program identifying unit, the related program determining unit, and the forgot-to-view display control unit are terminated.

The 4$^{th}$ aspect of the present invention is the program reception terminal according to the 1$^{st}$ aspect of the present invention, wherein
 the forgot-to-view program identifying unit comprises:
 a want-to-view program searching unit that searches whether there is the want-to-view program among all programs in a past predetermined period before the predetermined time; and
 a forgot-to-view program determining unit that searches whether there is a not-yet-viewed program in the want-to-view programs found out by the searching and that determines the program found out by the searching as the forgot-to-view program.

The 5$^{th}$ aspect of the present invention is the program reception terminal according to the 1$^{st}$ aspect of the present invention, wherein
 the forgot-to-view program identifying unit comprises:
 a not-yet-viewed program extracting unit that extracts not-yet-viewed programs from all programs in a past predetermined period before the predetermined time; and
 a forgot-to-view program determining unit that searches whether there is the want-to-view program in the not-yet-viewed programs and that determines the program found out by the searching as the forgot-to-view program.

The 6$^{th}$ aspect of the present invention is the program reception terminal according to the 1$^{st}$ aspect of the present invention, wherein
 the related program is at least one program in the want-to-view programs to which the forgot-to-view program belongs.

The 7$^{th}$ aspect of the present invention is the program reception terminal according to the 1$^{st}$ aspect of the present invention, comprising
 a program guide information receiving unit that receives program guide information, wherein
 the forgot-to-view display control unit is a program guide display control unit that displays the existence of the forgot-to-view program on the program guide when displaying a program guide based on the program guide information.

The 8$^{th}$ aspect of the present invention is the program reception terminal according to the 1$^{st}$ aspect of the present invention, wherein
 the forgot-to-view display control unit is a video composite display control unit that multiplexes the display of the existence of the forgot-to-view program with a viewing screen to display the existence or displays the existence on a screen different from the viewing screen at a predetermined time before the start or the end of the related program.

The 9$^{th}$ aspect of the present invention is the program reception terminal according to the 7$^{th}$ aspect of the present invention, wherein
 the program guide display control unit displays the existence of the forgot-to-view program in one of the frames of a program field of a channel to which the related program belongs.

The 10$^{th}$ aspect of the present invention is the program reception terminal according to the 7$^{th}$ aspect of the present invention, wherein
 the program guide display control unit displays the existence of the forgot-to-view program in a time display field.

The 11$^{st}$ aspect of the present invention is the program reception terminal according to the 7$^{th}$ aspect of the present invention, wherein
 when the start time of the related program is changed, the program guide display control unit moves the display indicating the existence of the forgot-to-view program from the location for display before the change.

The 12$^{th}$ aspect of the present invention is the program reception terminal according to the 7$^{th}$ aspect of the present invention, wherein
 the program guide display control unit deletes the display of the existence of the forgot-to-view program from the program guide during viewing of the forgot-to-view program, at the start of the program displayed with the existence of the forgot-to-view program, or after a certain time from the start of the program displayed with the existence of the forgot-to-view program.

The 13$^{th}$ aspect of the present invention is the program reception terminal according to the 7$^{th}$ aspect of the present invention, wherein if the existence of the forgot-to-view program is not displayed in a currently displayed program guide, the program guide display control unit displays the existence of the forgot-to-view program in a channel display field of the currently displayed program guide.

The 14th aspect of the present invention is the program reception terminal according to the 9th aspect of the present invention, wherein the program guide display control unit displays the existence of the forgot-to-view program in the frame of the related program.

The 15th aspect of the present invention is the program reception terminal according to the 9th aspect of the present invention, wherein the program guide display control unit displays the existence of the forgot-to-view program in the frame of the related program until a predetermined time before the start of the broadcast of the related program and displays the existence of the forgot-to-view program in the frame of a program, which is broadcasted before the related program, after the predetermined time before the start of the broadcast of the related program.

The 16th aspect of the present invention is the program reception terminal according to the 15th aspect of the present invention, wherein the program guide display control unit displays the existence of the forgot-to-view program in the frame of the related program before the broadcast starting day of the related program and displays the existence of the forgot-to-view program in the frame of a program, which is broadcasted before the related program, on the broadcast starting day of the related program.

The 17th aspect of the present invention is the program reception terminal according to the 9th aspect of the present invention, comprising a forgot-to-view program time management unit that manages the playback time of the forgot-to-view program, wherein the program guide display control unit displays the existence of the forgot-to-view program in the frame of a program that starts at least the playback time before the start of the broadcast of the related program.

The 18th aspect of the present invention is the program reception terminal according to the 17th aspect of the present invention, wherein if a plurality of forgot-to-view programs exist with respect to one piece of the related information, the forgot-to-view program time management unit sets the total time of each playback time of the plurality of forgot-to-view programs as the playback time.

The 19th aspect of the present invention is the program reception terminal according to the 9th aspect of the present invention, wherein the program guide display control unit displays the existence of the forgot-to-view program in the frames of programs of a plurality of channels in the same zone of time as the related program or in the frames of programs of a plurality of channels in the same zone of time as a program before the related program.

The 20th aspect of the present invention is the program reception terminal according to the 9th aspect of the present invention, wherein when the display indicating the existence of the forgot-to-view program is displayed in the frame of a program before the related program, the program guide display control unit sequentially moves the display indicating the existence of the forgot-to-view program to the following program fields up to the related program if viewing of the forgot-to-view program is not started at the start of the program displayed with the existence of the forgot-to-view program or after a certain time from the start of the program.

The 21st aspect of the present invention is the program reception terminal according to the 7th aspect of the present invention, wherein the program guide display control unit displays the existence of the forgot-to-view program in the program frame of a currently viewed program in the program guide.

The 22nd aspect of the present invention is the program reception terminal according to the 1st aspect of the present invention, comprising a playback unit that playbacks the forgot-to-view program at a predetermined time before the start time of the related program if the user makes a selection corresponding to the display.

The 23rd aspect of the present invention is the program reception terminal according to the 1st aspect of the present invention, wherein the forgot-to-view program is recorded if the user makes a selection corresponding to the display.

The 24th aspect of the present invention is a program transmission/reception system comprising:

a program broadcasting station that broadcasts programs;

a program reception terminal comprising: a receiving unit that receives the programs for viewing; a history creating unit that creates a viewing history based on viewed programs; a history storing unit that stores the created viewing history; a want-to-view program identifying unit that identifies a want-to-view program of a viewer based on the viewing history; a forgot-to-view program identifying unit that identifies a forgot-to-view program based on the want-to-view program and a result of a determination of viewing or not-yet-viewing until a predetermined time; a related program determining unit that determines whether a related program identified from the forgot-to-view program based on a predetermined rule exists in a program group in a predetermined period later than the predetermined time; and a forgot-to-view display control unit that displays the existence of the forgot-to-view program if the related program exists; and a program distributing apparatus comprising: a storage unit that stores the programs; a searching unit that searches whether the forgot-to-view program exists in the storage unit; and a distributing unit that distributes the forgot-to-view program to the program reception terminal, wherein if the forgot-to-view program does not exist in the storage unit, the forgot-to-view display control unit does not display the existence of the forgot-to-view program.

The 25th aspect of the present invention is a program reception method comprising:

a reception step by a receiving unit to receive programs for viewing;

a history creation step by a history creating unit to create a viewing history based on viewed programs;

a history storage step by a history storing unit to store the created viewing history;

a want-to-view program identification step by a want-to-view program identifying unit to identify a want-to-view program of a viewer based on the viewing history a forgot-to-view program identification step by a forgot-to-view program identifying unit to identify a forgot-to-view program based on the want-to-view program and a result of a determination of viewing or not-yet-viewing until a predetermined time;

a related program determination step by a related program determining unit to determine whether a related program identified from the forgot-to-view program based on a predetermined rule exists in a program group in a predetermined period later than the predetermined time; and a display step by a forgot-to-view display control unit to display the existence of the forgot-to-view program if the related program exists.

The 26th aspect of the present invention is a program embodied on a non-transitory computer-readable medium, the program causing a computer to execute steps of the program reception method according to the 25th aspect of the present invention, the program reception method comprising:

the history creation step by the history creating unit to create a viewing history based on viewed programs; the history storage step by the history storing unit to store the created viewing history; the want-to-view program identification step by the want-to-view program identifying unit to identify a want-to-view program of a viewer based on the viewing history; the forgot-to-view program identification step by the forgot-to-view program identifying unit to identify a forgot-to-view program based on the want-to-view program and a result of a determination of viewing or not-yet-viewing until a predetermined time; the related program determination step by the related program determining unit to determine whether a related program identified from the forgot-to-view program based on a predetermined rule exists in a program group in a predetermined period later than the predetermined time; and the display step by the forgot-to-view display control unit to display the existence of the forgot-to-view program if the related program exists.

Advantage of the Invention

As described above, the present invention can provide a program reception terminal, a program transmission/reception system, and the like, in which the user does not particularly have to intentionally perform searching, and the user can naturally recognize a forgot-to-view program in a daily act of viewing TV broadcasting or TV guide.

BRIEF DESCRIPTION OF DRAWINGS

FIGS. 4(a) and (b) are diagrams showing an example of an EPG generated by the program receiving apparatus in the first embodiment of the present invention;

FIGS. 5(a) and (b) are diagrams showing another example of an EPG generated by the program receiving apparatus in the first embodiment of the present invention;

FIGS. 7(a) and (b) are diagrams showing an example of an EPG generated by the program receiving apparatus in the second embodiment of the present invention;

FIG. 8 is a diagram showing another example of an EPG generated by the program receiving apparatus in the second embodiment of the present invention;

FIG. 9 is a diagram showing another example of an EPG generated by the program receiving apparatus in the second embodiment of the present invention;

FIGS. 13(a) and (b) are diagrams showing another example of an EPG generated by the program receiving apparatus in the first and second embodiments of the present invention;

FIG. 14(a) is a diagram showing another example of an EPG generated by the program receiving apparatus in the first and second embodiments of the present invention;

FIG. 14(b) is a diagram showing another example of an EPG generated by the program receiving apparatus in the first and second embodiments of the present invention;

FIG. 14(c) is a diagram showing another example of an EPG generated by the program receiving apparatus in the first and second embodiments of the present invention;

DESCRIPTION OF EMBODIMENTS

Hereinafter, embodiments according to the present invention will be described with reference to the drawings.

(First Embodiment)

Hereinafter, a program transmission/reception system of a first embodiment according to the present invention will be described with reference to the drawings.

Figure 1:
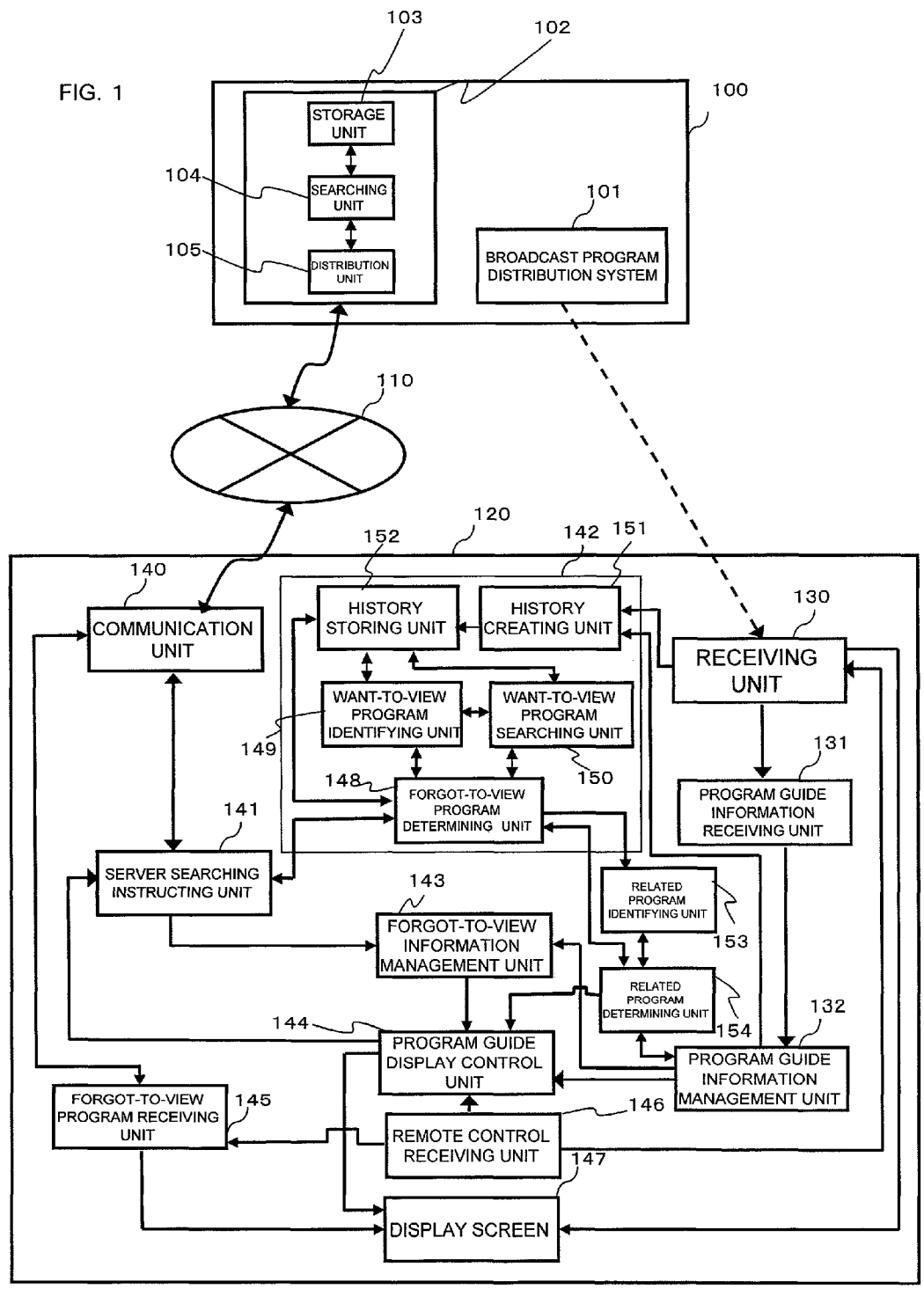
FIG. 1 is a diagram showing a configuration of a program transmission/reception system in a first embodiment of the present invention.

FIG. 1 is a diagram showing a configuration of the program transmission/reception system in the first embodiment of the present invention.

As shown in FIG. 1, the program transmission/reception system of the present first embodiment comprises a broadcasting station 100 that broadcasts programs and a program receiving apparatus 120 possessed by a user to receive a broadcasted program.

The broadcasting station 100 comprises: a broadcasting program distribution system 101 that distributes a program broadcasted currently or in the future using ground waves, satellite waves, the Internet, and the like; and a forgot-to-view program distribution system 102 including a distribution server and the like that stores already broadcasted programs and distributes the already broadcasted programs.

The forgot-to-view program distribution system 102 comprises a storage unit 103 that stores already broadcasted programs, a searching unit 104 that searches a program in the storage unit 103, and a distribution unit 105 that distributes the program found out by the searching to the program receiving apparatus 120. The storage unit 103, the searching unit 104, and the distribution unit 105 constitute the distribution server.

Next, the program receiving apparatus 120 equivalent to an example of a program reception terminal of the present invention will be described.

The program receiving apparatus 120 according to the present first embodiment comprises a receiving unit 130 that receives broadcast from the broadcasting station 100, a program guide information receiving unit 131 that receives an electronic program guide (EPG) of broadcast programs, and a program guide information management unit 132 that manages EPG information received by the program guide information receiving unit 131.

Furthermore, a history management unit 142 that creates a viewing history based on the programs that the user has selected channels to receive and that manages tendency or history of viewing is included.

The history management unit 142 comprises: a history creating unit 151 that creates a viewing history based on EPG information in a past predetermined period and based on received programs; a history storing unit 152 that stores the created viewing history; and a want-to-view program identifying unit 149 that identifies a "want-to-view program" of the viewer based on the viewing history. The "want-to-view program" means such a program that the viewer wants to view. Furthermore, the history management unit 142 comprises a want-to-view program searching unit 150 that searches whether the "want-to-view program" identified by the want-to-view program identifying unit 149 is included among all programs in a past predetermined period (for example, three weeks). The history management unit 142 also comprises a forgot-to-view program determining unit 148 that searches, when the "want-to-view program" exists, whether a not-yet-viewed program is in the "want-to-view program" found out by the searching, and when there is a "not-yet-viewed program", determines the "not-yet-viewed program" as the "forgot-to-view program". The "not-yet-view program" means such a program that the viewer has not viewed yet.

The program receiving apparatus 120 comprises: a communication unit 140 connected to the forgot-to-view program distribution system 102 of the broadcasting station 100 through a public line network 110 such as th Internet; and a server searching instructing unit 141 that transmits an instruction for searching the location of the "forgot-to-view program" in the storage unit 103 to the searching unit 104 through the communication unit 140. A forgot-to-view information management unit 143 that receives information related to the "forgot-to-view program" searched by the searching unit 104 through the communication unit 140 and that manages the information is also included. The information related to the "forgot-to-view program" includes information of whether the "forgot-to-view program" exists in the storage unit 103. If the "forgot-to-view program" exists, information such as playback time is also included in the information related to the "forgot-to-view program".

Furthermore, the program receiving apparatus 120 comprises a related program identifying unit 153 that identifies a "related program" related to the "forgot-to-view program" from the "forgot-to-view program" based on a predetermined rule; and a related program determining unit 154 that determines whether the "related program" exists in a program group in a predetermined period in the future based on EPG information.

The program receiving apparatus 120 also comprises a program guide display control unit 144 that provides a mark indicating the existence of the "forgot-to-view program" to the EPG if the "forgot-to-view program" exists in the storage unit 103 and if the "related program" also exists. The program guide display control unit 144 is equivalent to an example of a forgot-to-view display control unit of the present invention.

The program receiving apparatus 120 also comprises a remote control receiving unit 146 that receives operation input from the user and a forgot-to-view program receiving unit 145 that receives the "forgot-to-view program" from the forgot-to-view program distribution system 102 as a mark is selected by a remote control.

The broadcast received by the receiving unit 130, information related to the broadcast, the "forgot-to-view program" received by the forgot-to-view program receiving unit 145, information related to the "forgot-to-view program", EPG information, and the like are displayed by a display screen 147. An example of the display screen includes a display. An example of the program receiving apparatus 120 includes a TV.

Next, an operation of the program transmission/reception system of the present first embodiment will be described with reference to the drawings, and an example of a program reception method of the present invention will be described at the same time.

First, a summary of an operation of the program transmission/reception system of the present embodiment will be described, and then the operation will be described in more detail using diagrams showing flows of the processes as in FIGS. 2 and 3 described below.

In FIG. 1, when the user receives a broadcast program by the receiving unit 130, the history management unit 142 creates a viewing history from past EPG information along with the received program name, time, and the like, and records the viewing history.

The history management unit 142 identifies a "forgot-to-view program", which is a program that may have been forgotten to view, from the viewing history as described below, and the server searching instructing unit 141 transmits a command for instructing searching to the broadcasting station 100 through the communication unit 140.

Then, the presence of the "forgot-to-view program" is searched, and if the "forgot-to-view program" exists in the forgot-to-view program distribution system 102 of the broadcasting station 100, the program guide display control unit 144 provides a "forgot-to-view" mark to a "related program", which is a program related to the "forgot-to-view program", in the program guide. The "related program" is managed by the program guide information management unit 132.

For example, when series programs, such as a drama, are broadcasted, if the user has viewed a first episode but has not viewed a second episode, the second episode is identified as the "forgot-to-view program". Then, the programs following the next episode of the drama are identified as the "related programs" of the "forgot-to-view program (second episode)". Thus, the second episode is the "forgot-to-view program", and if the second episode exists in the forgot-to-view program distribution system 102, the "forgot-to-view" mark is displayed in a frame of the third episode, which is a "related program" of the drama, in the EPG.

Then, as the user selects the "forgot-to-view" mark displayed on the EPG by the operation of a remote control or the like, the remote control receiving unit 146 receives a selection instruction from the remote control and connects communication with the forgot-to-view program distribution system 102. Then, the forgot-to-view program distribution system 102 transmits a program with the same content as the forgotto-view program, and the program is received by the forgot-to-view program receiving unit 145 and displayed on the display screen 147.

Next, a process of the program receiving apparatus 120 in the first embodiment of the present invention will be described in more detail with reference to the drawings.

Figure 2:
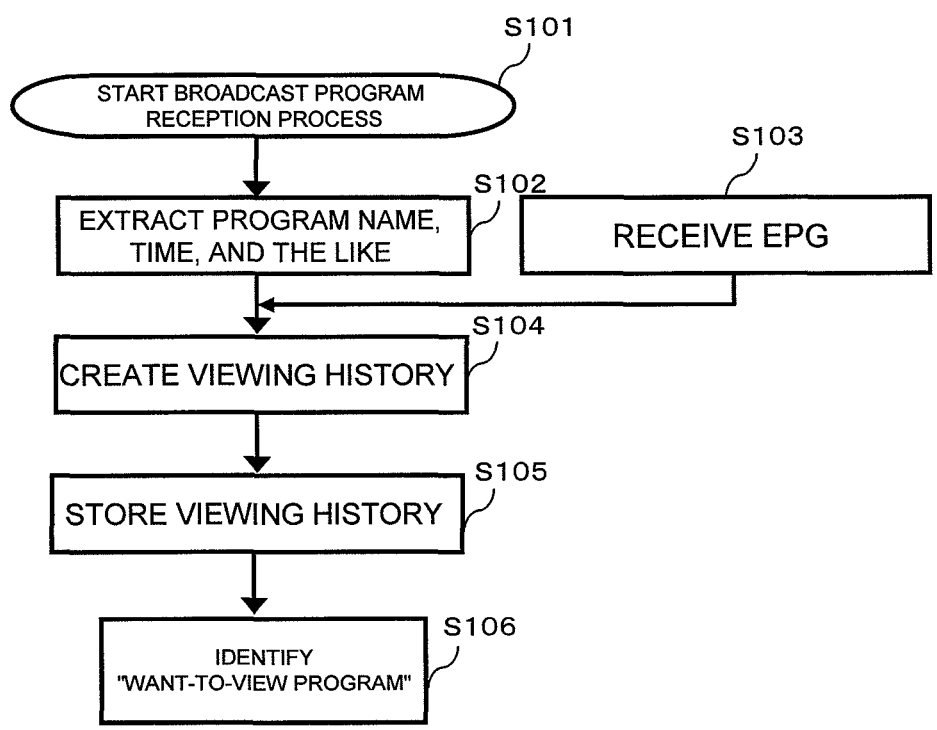
FIG. 2 is a diagram showing a flow of a control process of a program receiving apparatus in the first embodiment of the present invention.

First, FIG. 2 is a diagram showing a flow of a process of an operation that the program receiving apparatus 120 in the first embodiment of the present invention performs on a regular basis. Steps will be abbreviated and described as S in the drawings and the present application.

Processes that the program receiving apparatus 120 execute on a regular basis (creating history and identifying want-to-view program) will be described.

In FIG. 2, when the user receives a broadcast program by the receiving unit 130 (S101), the history creating unit 151 extracts the received program name, time, and the like (S102). Meanwhile, EPG information is also transmitted to the history creating unit 151 (S103), and the history creating unit 151 creates a viewing history of names, times, and the like of programs viewed in a past predetermined period based on the EPG information, extracted program names, times, and the like (S104). Then, the viewing history, EPG information, and the like are stored in the history storing unit 152 (S105). An example of a reception step of the present invention is equivalent to S101. An example of a history creation step of the present invention is equivalent to S104, and an example of a history storage step of the present invention is equivalent to S105.

In the history management unit 142, the want-to-view program identifying unit 149 identifies a "want-to-view program" of the user based on the viewing history stored in the history storing unit 152 and based on a predetermined rule (S106). For example, in a series programs, such as a drama series A1, broadcasted from 20 o'clock on 2*ch* in the EPG shown in FIG. 4(*a*), if a first episode is viewed, a third episode, a fourth episode, . . . after a second episode of the drama series A1 are identified as the "want-to-view program". In this case, the predetermined rule is a rule "when one of the episodes in a drama series is viewed, identify all programs in the drama series as "want-to-view programs"". Here, a plurality of types of "want-to-view programs" may be selected, and for example, Yomiuri Giants vs. Hanshin Tigers of professional baseball and news A2 program of 21 o'clock of channel 2 can be set as the "want-to-view programs". The predetermined rule in this case is a rule "when the numbers of times of viewing specific programs are statistically and significantly greater than other same types of programs in the past history of viewing (for example, more than three times greater), identify all specific programs as "want-to-view programs". S106 is equivalent to an example of a want-to-view program identification step of the present invention.

In this way, the viewing history creation and the identification of "want-to-view programs" are performed on a daily basis. Next, an operation of the program transmission/reception system when the user sees the EPG on the display screen 147 will be described. Along with the description, an operation of the program receiving apparatus 120, which is an example of the program reception method of the present invention, will be described at the same time.

Figure 3:
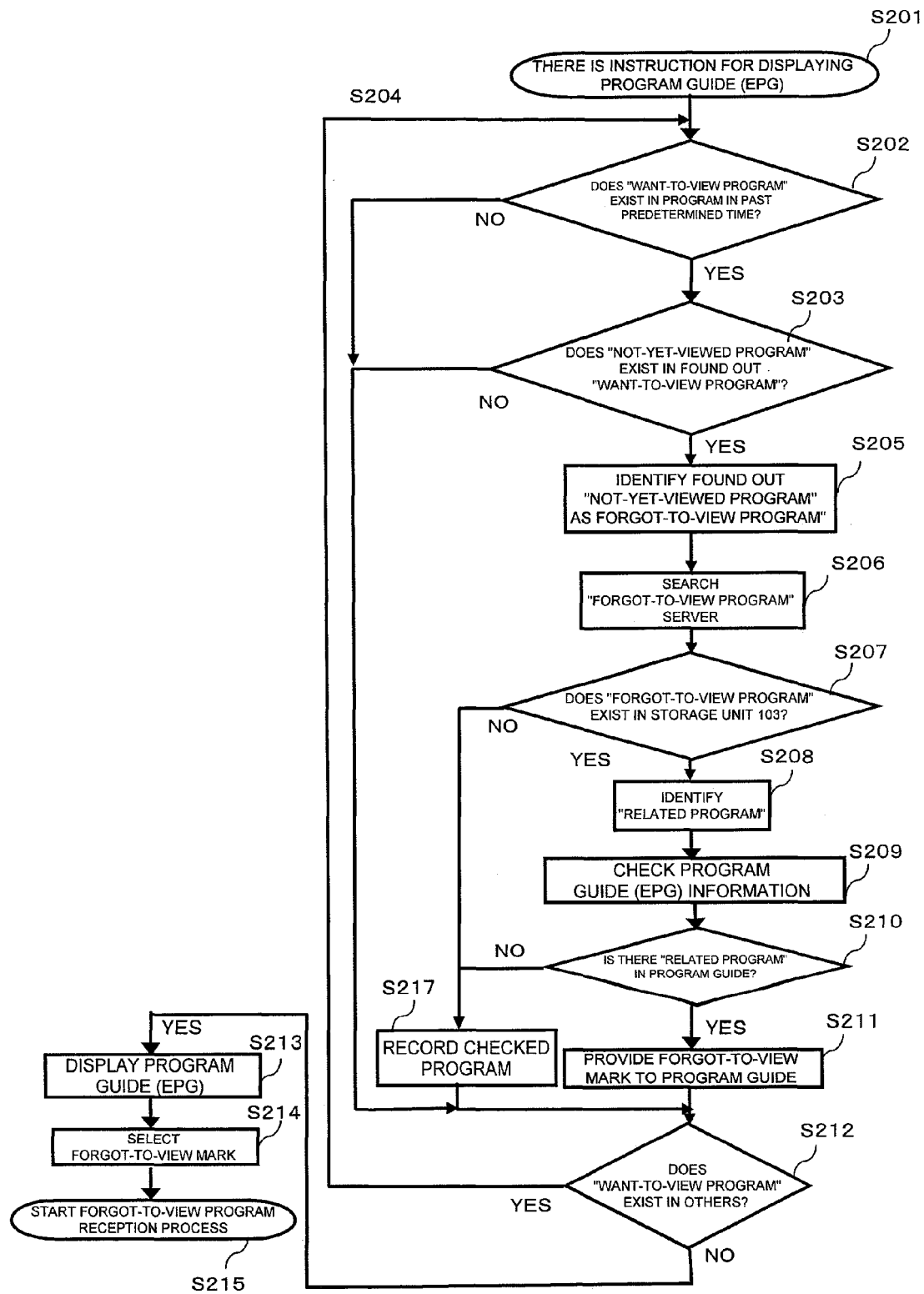
FIG. 3 is a diagram showing a flow of a control process of the program receiving apparatus in the first embodiment of the present invention.

FIG. 3 is a diagram showing a flow of a process executed when the program receiving apparatus 120 in the first embodiment of the present invention receives a display instruction of EPG from the user. FIG. 4(*a*) is a diagram showing an example of the EPG. In the EPG, a row or a column will be called a field, and one box will be called a frame.

In FIG. 3, when the remote control receiving unit 146 receives an instruction for displaying the EPG on the display screen 147 (S201), the history management unit 142 identifies a "forgot-to-view program" from viewing history information managed by the history storing unit 152 (S202, S203, and S205).

Describing more specifically, the want-to-view program searching unit 150 searches whether there is the "want-to-view program" identified by the want-to-view program identifying unit 149 among all programs in a past predetermined period (three weeks) (S202). Here, if there are a plurality of types of "want-to-view programs", one type of program is selected first, and whether there is the selected program among all programs in the past predetermined period is searched. Here, it is assumed that the drama series A1 is selected.

If the "want-to-view programs" exist, the forgot-to-view program determining unit 148 searches whether there is a not-yet-viewed program in the past "want-to-view programs" found out by searching (S203). The searching of whether there is a "not-yet-viewed program" is performed using the viewing history of the history storing unit 152 and the "want-to-view programs" found out by searching. Then, if a not-yet-viewed program exists as a result of searching, the "not-yet-viewed program" is determined as the "forgot-to-view program" (S205). For example, if the second episode of the drama series A1 is not viewed, a "not-yet-viewed program" exists in the "want-to-view programs". Therefore, the second episode of the drama series A1 is determined as the "forgot-to-view program". S202, S203, and S205 described above are equivalent to an example of a forgot-to-view program identification step of the present invention.

As described, although the terminal identifies the "want-to-view program" on a regular basis, the arrangement is not necessarily limited to this. The terminal may not identify the "want-to-view program" on a regular basis, but may identify the "want-to-view program" after an instruction for displaying the program guide (EPG).

On the other hand, if the "want-to-view program" is not found out among all programs in the past predetermined period (three weeks) in S202, the control proceeds to S212, and whether there is another type of "want-to-view program" is determined. For example, if there is Yomiuri Giants vs. Hanshin Tigers of professional baseball as another type of "want-to-view program" (S204), the control returns to S202, and whether a "want-to-view program" related to Yomiuri Giants vs. Hanshin Tigers of professional baseball exists among all programs in the past predetermined period (three weeks) is checked.

In S203, when the "not-yet-viewed program" is not found out in the "want-to-view program" found out by searching, the control also proceeds to S212, and whether there is another type of "want-to-view program" is determined.

In S205, if the "forgot-to-view program" is identified, the server searching instructing unit 141 instructs the forgot-to-view program distribution system 102 to search the presence of the "forgot-to-view program" through the communication unit 140 (S206). More specifically, the server searching instructing unit 141 instructs the forgot-to-view program distribution system 102 to search whether the "forgot-to-view program" of the second episode of the drama series A1 is stored in the storage unit 103. Consequently, the searching unit 104 searches the storage unit 103 and checks whether the "forgot-to-view program" exists in the forgot-to-view program distribution system 102 of the broadcasting station 100 (S207).

If the "forgot-to-view program" exists in the storage unit 103, the server searching instructing unit 141 notifies the forgot-to-view information management unit 143 that the "forgot-to-view program" exists.

If the "forgot-to-view program" does not exist in the storage unit 103 in S207, in the history management unit 142, the forgot-to-view program determining unit 148 records that the presence of the "forgot-to-view program" related to the drama series A1 is checked (S217).

The process then proceeds to S212, and the forgot-to-view program determining unit 148 determines whether there is another type of "want-to-view program". A program for which the existence in the storage unit 103 is once checked may also be periodically checked, because the forgot-to-view program may be registered in the distribution server of the forgot-to-view program distribution system 102 of the broadcasting station 100 at a later day.

On the other hand, if the "forgot-to-view program" exists in the storage unit 103 in S207, the related program identifying unit 153 identifies the "related program" in accordance with a predetermined rule in S208. Specifically, the second episode of the drama series A1 of channel 2 is identified as the "forgot-to-view program", and the programs after the next episode of the second episode (or all identified drama series) are identified as the "related programs" of the "forgot-to-view program". The predetermined rule in this case is a rule "identify all programs belonging to a "want-to-view program" group, to which the "forgot-to-view program" belongs, as "related programs" of the "forgot-to-view program"". For example, if a predetermined drama series is identified as the "want-to-view program" as described above, the episode programs after X-th episode, which the user has forgotten to view, (or all predetermined drama series) are identified as the "related programs" related to the X-th episode program which has been forgotten to view. Alternatively, if Yomiuri Giants vs. Hanshin Tigers is identified as the "want-to-view program", a program group of other Yomiuri Giants vs. Hanshin Tigers is set as the "related program" in relation to a Yomiuri Giants vs. Hanshin Tigers program of May 1 (broadcasted before today), which has been forgotten to view.

When the "related programs" are identified in S208 described above, the related program determining unit 154 checks whether a "related program" of the "forgot-to-view program" is in the programs of the EPG of the next two weeks, the programs of which are managed by the program guide information management unit 132 (S209). If the "related program" exists in the EPG in S210, that fact is transmitted to the program guide display control unit 144.

On the other hand, if there is no "related program" (such as the third episode of the drama series A1 here) (S210), the forgot-to-view program determining unit 148 records the type of the "forgot-to-view program" in which the presence of the "related program" is checked (S217). Then, the control proceeds to S212, and the want-to-view program identifying unit 149 determines whether there is another type of "want-to-view program". It is more preferable to periodically check the "related program" that is checked once, because it may exist in the EPG distributed later.

In S210, if the "related program" (the third episode of the drama series A1 here) exists, the program guide display control unit 144 displays a "forgot-to-view" mark on the frame of the third episode of the drama series A1 of the EPG (S211). S208, S209, and S210 are equivalent to an example of a related program determination step of the present invention.

Next, in S212, the want-to-view program identifying unit 149 determines whether another type of "want-to-view program" exists (S212). If another type of "want-to-view program" exists, the process returns to S202, and whether the other type of "want-to-view program" exists in the programs in the past predetermined period is determined. More specifically, after the process related to the drama series A1 is finished, the processes from S202 to S211 are executed in relation to Yomiuri Giants vs. Hanshin Tigers of professional baseball and then in relation to the news A2 started from 21 o'clock on 2*ch*.

After the process related to all types of "want-to-view program" is finished, the program guide display control unit 144 displays the EPG on the display screen 147 (S213). FIG. 4(*b*) shows an example 310 of EPG in which a "forgot-to-view" mark is indicated. S213 is equivalent to an example of a display step of the present invention. Although FIG. 4(*b*) illustrates an example that the "forgot-to-view" mark is displayed only on the third episode of the drama A1, the "forgot-to-view" mark is obviously displayed on the news A2 if the news A2 is determined as a "want-to-view program" and if a "not-yet-viewed program" exists.

When the user presses a determination button of a remote control in the frame of the drama series A1 third episode in the EPG, information of the third episode of the drama series A1 is usually displayed. However, if the user presses a specific button, such as a button for data broadcast reception, a "forgot-to-view" mark 311 is selected (S214).

Consequently, the remote control receiving unit 146 receives a selection instruction from the remote control, and the program receiving apparatus 120 accesses the storage unit 103 of the forgot-to-view program distribution system 102 through the communication unit 140. As the forgot-to-view program receiving unit 145 receives the "forgot-to-view program", the "forgot-to-view program" is displayed on the display screen 147 (S215), and viewing of the "forgot-to-view program" starts (S215).

After the reception of the "forgot-to-view program", the program guide display control unit 144 deletes the "forgot-to-view" mark 311 from the EPG.

More specifically, in the present embodiment, if there is a "forgot-to-view program" which is a program that the user has forgotten to view or record, or may have forgotten to view or record, the user can confirm the presence of the "forgot-to-view program" by displaying an icon indicating that matter in EPG or the like. As the user selects the icon, the program viewing terminal can playback the "forgot-to-view program" acquired from the program distribution system stored in the broadcasting station.

As described, when the user wants to view a forgot-to-view episode before the start of the next episode in a drama series or in other cases, the program receiving apparatus 120 of the present first embodiment can notify the user of the existence of the "forgot-to-view program" before the start of the next episode, with the next episode (related program) as a trigger, just by the user looking at the EPG used for viewing TV or recording, even if the user forgets the existence of the "forgot-to-view program". In this way, forgetting of continuous programs is also taken into consideration, and the apparatus is very friendly for the user.

Although the present first embodiment only illustrates displaying the "forgot-to-view" mark in the frame of the "related program", the arrangement is not limited to this. For example, the existence of the "forgot-to-view program" can be appropriately notified to the user in accordance with the date by displaying the mark location of "forgot-to-view" in a frame of a program before the "related program" in the EPG on the day that the "related program" of the "forgot-to-view program" is broadcasted and by displaying the mark in the frame of the "related program" of the "forgot-to-view program" before the day that the "related program" is broadcasted so that the existence of the "forgot-to-view program" can be easily recognized.

Specifically, as shown in FIG. 5(a), if the broadcast of the "related program" of the "forgot-to-view program" is on May 11, as for a mark of "forgot-to-view", a "forgot-to-view" mark 401 is displayed in a frame of the third episode of the drama series A1, which is the "related program" of the "forgot-to-view program", until the day before (May 10 here), as in an EPG 400. As shown in FIG. 5(b), on May 11, the day of the broadcast, a "forgot-to-view" mark 411 is displayed on a program before the "related program", in the field of the news A1 here, as in an EPG 410.

The "forgot-to-view" mark may be moved not day by day, but hour by hour. Specifically, the "forgot-to-view" mark is displayed in the frame of the "related program" until, for example, four hours before the start of the broadcast of the third episode of the drama series A1, which is the "related program". If the time till the start of the broadcast of the "related program" is less than four hours, the "forgot-to-view" mark is displayed in the frame of the news A1, which is a program before the "related program".

Server searching information of the forgot-to-view program distribution system 102, such as URL (Uniform Resource Locator) of the server, used in the server searching instructing unit 141 may be registered in advance, or the broadcasting station 100 may multiplex the information with the broadcast program and transmit the information. The arrangement is not particularly limited.

In the present embodiment, a TV has been described as an example of the program receiving apparatus 120. However, the program receiving apparatus 120 does not have to be a TV, but may be a recording apparatus or a PC with transmission/reception functions. The program receiving apparatus 120 is not particularly limited as long as the EPG can be received, and the communication function is included.

The content of display of the "forgot-to-view" mark provided by the program guide display control unit 144 is not particularly limited, and the program that the user has forgotten to view may be specifically described, such as "Forgot-to-View: Drama Series A1, Second Episode".

Although an example of pressing a button for data broadcast reception has been described as an example of the selection method of the "forgot-to-view" mark, the selection method is not particularly limited as long as the distinction from a normal selection of program guide is possible.

(Second Embodiment)

Next, a program transmission/reception system in a second embodiment according to the present invention will be described with reference to the drawings. The basic configuration of the program transmission/reception system of the present second embodiment is the same as the first embodiment. However, the point that a playback time or the like of the "forgot-to-view program" is managed to prompt viewing the program at more appropriate timing is different from the first embodiment. Therefore, the difference will be mainly described. The same reference numerals are attached to configurations that are the same as or corresponding to the first embodiment.

Figure 6:
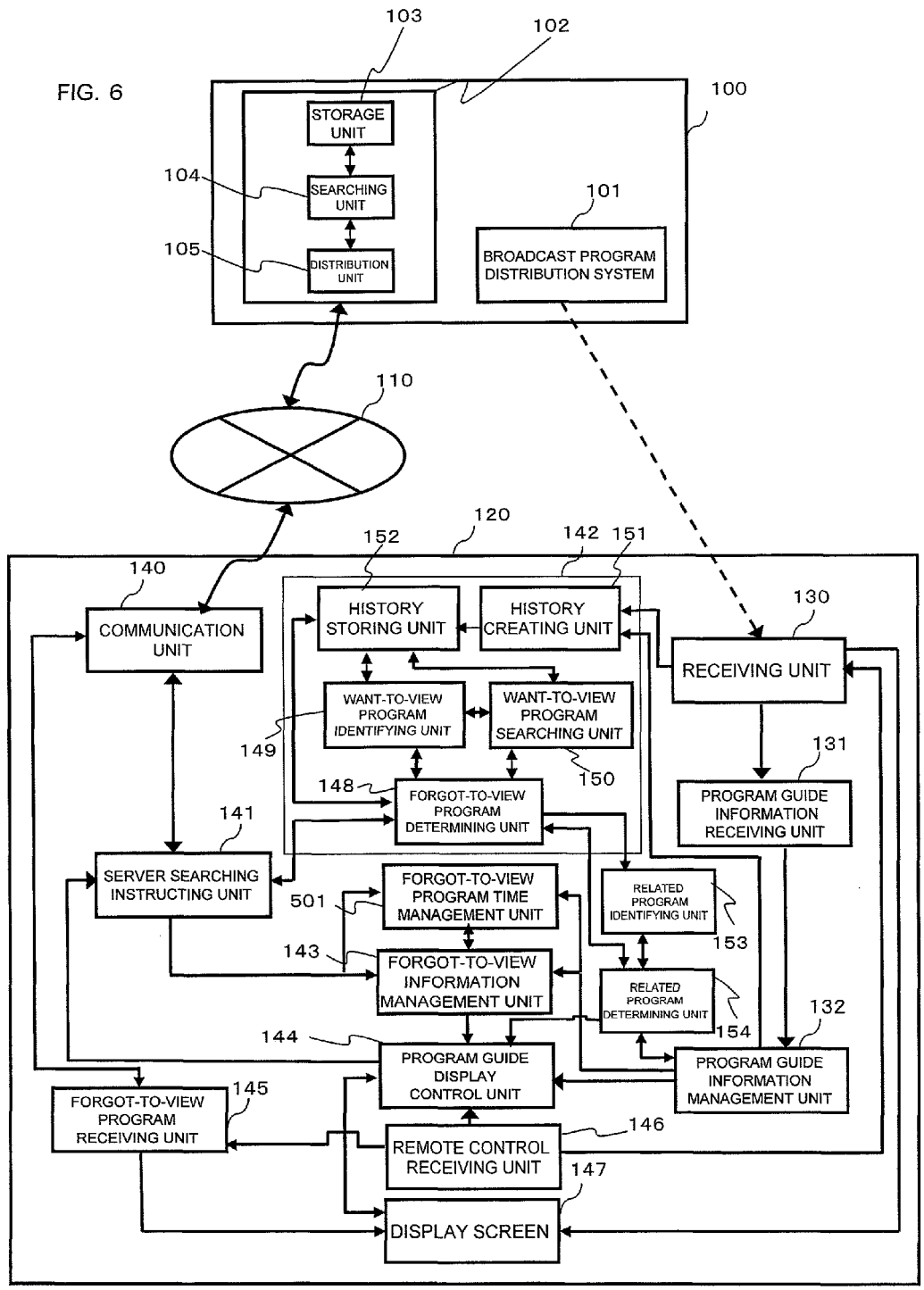
FIG. 6 is a diagram showing a configuration of a program transmission/reception system in a second embodiment of the present invention.

FIG. 6 is a diagram showing a configuration of the program transmission/reception system in the second embodiment of the present invention.

The program receiving apparatus 120 of the present second embodiment shown in FIG. 6 is the same as the program receiving apparatus described in the first embodiment, except that a forgot-to-view program time management unit 501 is installed. Therefore, other configurations will not be described. The forgot-to-view program time management unit 501 manages the start time of the related broadcast and to the playback time of the "forgot-to-view program".

FIGS. 7(a) and (b) are diagrams showing an example of EPG provided with a "forgot-to-view" mark.

When the forgot-to-view information management unit 143 acquired information of the "forgot-to-view program" from the forgot-to-view program distribution system 102, the forgot-to-view program time management unit 501 acquired the playback time of the "forgot-to-view program". Then, the program guide display control unit 144 displays a "forgot-to-view program" mark on a program that starts before the start of the "related program" and more than the playback time before the "forgot-to-view program".

For example, as shown in FIG. 7(a), if the user misses viewing the second episode, which is the last episode of the drama series A1 (third episode), broadcasted from 20 o'clock on 2ch of an EPG 610, and the "forgot-to-view program" exists in the forgot-to-view program distribution system 102, the forgot-to-view program time management unit 501 receives, from the server searching instructing unit 141, information that the playback time of the drama series A1 (second episode) is one hour. Then, information that the broadcast start time of the drama series A1 (third episode), which is the "related program", is 20 o'clock is received from the program guide information management unit 132.

As a result, in the forgot-to-view program time management unit 501, it is recognized that viewing of the "forgot-to-view program" can be started at 19 o'clock, which is one hour before the start of the broadcast of the third episode, to complete viewing the second episode, which is the "forgot-to-view program", before the start of the drama series A1 (third episode), which is the "related program". Then, the forgot-to-view program time management unit 501 transmits information related to the viewing start time to the program guide display control unit 144 through the forgot-to-view information management unit 143.

Consequently, as shown in FIG. 7(a), the program guide display control unit 144 displays a "forgot-to-view" mark 611 on the news A1, which is a program that starts from 19 o'clock. Then, as the user selects the "forgot-to-view program" at 19 o'clock, the user can view the second episode of the drama series A1, which is the "forgot-to-view program", from 19 o'clock and can continuously view the broadcast of the third episode, which is the "related program", from 20 o'clock, thereby allowing continuous viewing.

Meanwhile, if the user does not view the "forgot-to-view program" after 19 o'clock, as shown in FIG. 7(b), the program guide display control unit 144 displays the "forgot-to-view" mark 611 in the frame of the drama series A1 (third episode).

As described, the second embodiment is advantageous in that the user can provide the "forgot-to-view" mark on a frame of EPG broadcasted more than one hour before the next episode when, for example, a one-hour drama series has been forgotten to view just by looking at the EPG often used to view TV or for recording even if the user forgets viewing TV or recording, and the user can finish viewing the forgot-to-view program before the start of the related next program.

In the second embodiment, although the "forgot-to-view" mark is moved to the frame of the "related program" after 19 o'clock, the mark may not be moved.

The "forgot-to-view" mark may be provided not to the program starting at 19 o'clock which makes it continuous viewing, but to a program before the broadcast of the program. In the example here, the "forgot-to-view" mark may be provided to a program before 19 o'clock so that viewing of the second episode of the drama series A1 as the "forgot-to-view program" finishes before the start of the third episode of the drama series A1.

It is more effective to provide the "forgot-to-view" mark to the EPG frames of a plurality of programs or all of programs that allow continuous viewing of the "forgot-to-view program" and the "related program". FIG. 8 is a diagram showing an EPG 700 as an example when a "forgot-to-view" mark 701 is displayed on all programs planned to be broadcasted at 19 o'clock. In the EPG 700 shown in FIG. 8, the "forgot-to-view" mark 701 is provided to frames of a plurality of programs planned to be broadcasted at 19 o'clock which is one hour before the broadcast of the "related program". The "forgot-to-view" mark provided to frames of a plurality of programs may also be attached to the EPG in the first embodiment.

An equivalent advantage can be obtained by providing the "forgot-to-view" mark not to the program frames of EPG, but to one of the frames of the time field. An example of such an EPG is illustrated in FIG. 9. In an EPG 710 shown in FIG. 9, a "forgot-to-view" mark 711 is displayed on the time display frame indicating 19 o'clock. The method of displaying the "forgot-to-view" mark on one of the frames of the time display field this way may be applied to the program transmission/reception system of the first embodiment. For example, the "forgot-to-view" mark 401 shown in FIG. 5(a) may be displayed on the frame of 20 o'clock, and the "forgot-to-view" mark 411 shown in FIG. 5(b) may be displayed on the frame of 19 o'clock.

The time or program for displaying the "forgot-to-view" mark may be the time that allows continuous viewing with the "related program", the broadcast time of the "related program", or arbitrary time that viewing is completed before the start of the broadcast, or the mark may be provided to the time that the user often views or records based on the information of the history management unit 142, in other words, the time or program that the user will likely use the EPG.

Although an example has been described in which one "forgot-to-view program" exists, the present second embodiment can also be applied when there are two or more "forgot-to-view programs". Specifically, for example, when the user misses viewing the second episode of the drama series A1 as well as the following third episode, if the broadcast of the fourth episode starts from 20 o'clock, the playback time of the second episode (one hour) and the playback time of the third episode (one hour) are added to set the playback time to the total of two hours, and the "forgot-to-view" mark is provided to 18 o'clock which is two hours before the start of the broadcast. As a result, similar effects can be obtained when a plurality of forgot-to-view programs exist.

Although the broadcast program distribution system 101 and the forgot-to-view program distribution system 102 are in the same broadcasting station 100 in the description of the first and second embodiments of the present invention, the forgot-to-view program distribution system 102 may exist at another location such as, for example, a related company.

Although viewing in the present invention is, for example, an act of selecting a channel and receiving a program in the first and second embodiments, the program may be determined to be viewed when the program is displayed on the display screen 147 or when the display of the program is finished. If viewing is determined by the actual display, a program that is received but is just recorded without being viewed can also be handled as the "forgot-to-view program", which makes it more user-friendly.

Furthermore, in the first and second embodiments, when the "forgot-to-view program" does not exist in the forgot-to-view program distribution system 102, the "forgot-to-view" mark is not displayed even if the "related program" exists in the EPG. However, the "forgot-to-view" mark may be displayed even if the "forgot-to-view program" does not exist in the forgot-to-view program distribution system 102. Because, even if the "forgot-to-view program" does not exist in the forgot-to-view program distribution system 102, the user can, for example, borrow the program from a friend or the like before the "related program" is broadcasted if the user can recognize that the user has forgotten to view the program.

In the description of the first and second embodiments, simply put, control processes are executed in the order of extracting "want-to-view programs" on a regular basis, searching whether there are "not-yet-viewed programs" in the past "want-to-view programs" when there is an EPG display request from the user, identifying a "forgot-to-view program" from those, and searching whether the forgot-to-view program distribution system 102 can distribute the "forgot-to-view program". However, the order of processes may be appropriately changed back and forth.

For example, in the first and second embodiments, after the "forgot-to-view program" is identified, whether the "forgot-to-view program" exists in the forgot-to-view program distribution system 102 is searched. However, after the "want-to-view program" is identified, whether the "want-to-view program" exists in the storage unit 103 may be searched on a regular basis before the "forgot-to-view program" is identified. Alternatively, searching may be performed when there is an EPG display instruction.

In this way, there is an advantage that fewer processes are required in the control of searching the "want-to-view program" in advance, because identification of the "forgot-to-view program" or other acts do not have to be performed when the "want-to-view program" does not exist in the storage unit 103.

Meanwhile, in the control of searching whether the "forgot-to-view program" is in the storage unit 103 after identifying the "forgot-to-view program", there is an advantage that less amount of search is required than searching the "want-to-view program".

In the first and second embodiments, although a process of searching whether there are "want-to-view programs" among all programs in the EPG of the past predetermined period (three weeks), determining whether there is a "not-yet-viewed program" in the found out "want-to-view programs", and determining the program as the "forgot-to-view program" if the "not-yet-viewed program" is found out is executed, the order does not have to be this way. A control process of extracting "not-yet-viewed programs", searching whether there is a "want-to-view program" in the "not-yet-viewed programs", and determining the found out program as the "forgot-to-view program" may be executed. In short, the process can be executed in any order as long as the "forgot-to-view program" can be identified.

Figure 10:
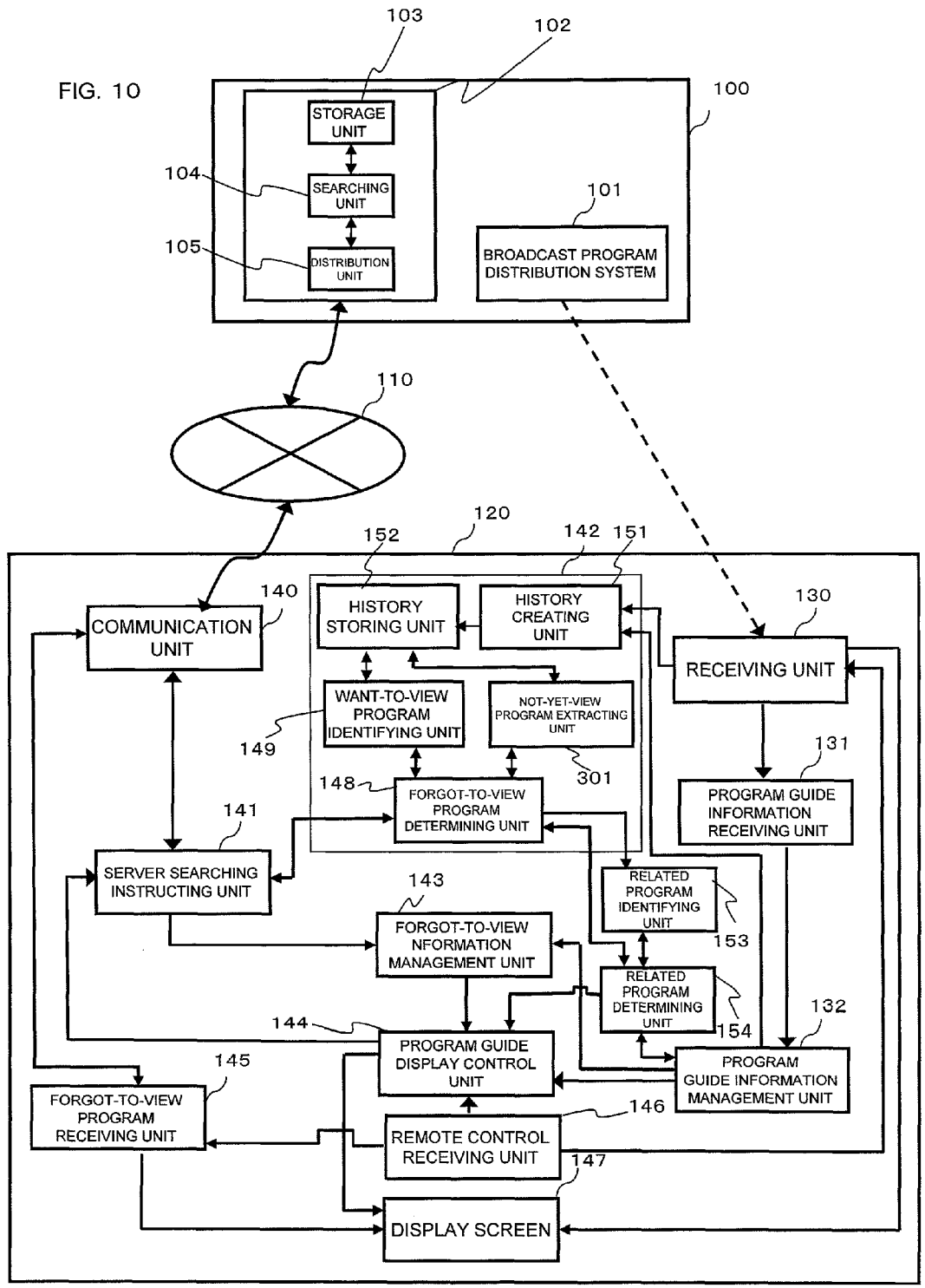
FIG. 10 is a diagram showing a configuration of another example of the program transmission/reception system in the first embodiment of the present invention.

FIG. 10 is a block diagram of the program transmission/reception system for performing such a control of extracting a not-yet-viewed program first. Compared to FIG. 1, the program receiving apparatus 120 shown in FIG. 10 comprises a not-yet-viewed program extracting unit 301 in place of the want-to-view program searching unit 150. The not-yet-viewed program extracting unit 301 extracts a "not-yet-viewed program" from the viewing history in a past predetermined period.

Figure 11:
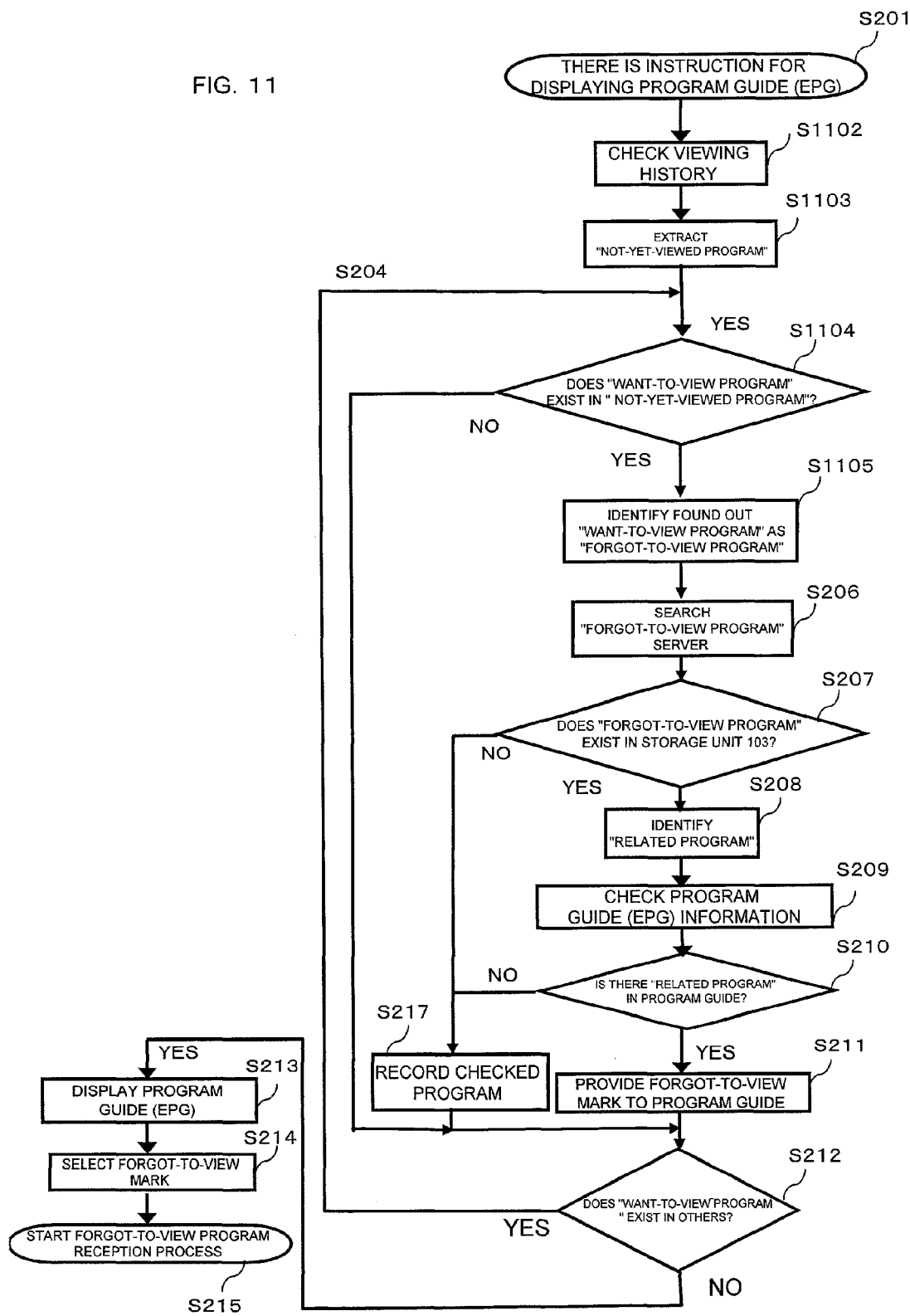
FIG. 11 is a diagram showing a flow of a control process of the program receiving apparatus shown in FIG. 10.

FIG. 11 is a diagram showing a flow of a process executed when the program receiving apparatus 120 shown in FIG. 10 receives an instruction of EPG from the user.

As shown in FIG. 11, in the program receiving apparatus 120 shown in FIG. 10, when there is an instruction for displaying the EPG, the not-yet-viewed program extracting unit 301 checks the viewing history of the user (S1102) and extracts not-yet-viewed programs (S1103).

More specifically, the viewing history stored in the history storing unit 152 includes information of viewing and of EPG in a past predetermined period. Therefore, the not-yet-viewed program extracting unit 301 extracts "not-yet-viewed programs" in the past predetermined period. Here, the past predetermined period can be, for example, three weeks.

As described, although the terminal identifies the "want-to-view program" on a regular basis, the arrangement is not necessarily limited to this. The terminal may identify the "want-to-view program" not on a regular basis, but before or after an extraction step of the "not-yet-viewed program".

Next, the history management unit 142 identifies the "forgot-to-view program" from the viewing history managed by the history storing unit 152 (S1104 and S1105).

Describing in detail, the forgot-to-view program determining unit 148 searches whether the "want-to-view program" identified in S106 described above exists in the "not-yet-viewed programs" extracted in S1103 described above (S1104). Here, when there are a plurality of types of "want-to-view programs", one type of program is first selected, and whether the selected program is in the "not-yet-viewed programs" is searched. Here, it is assumed that the drama series A1 is selected.

Then, if the "want-to-view program" is found in the "not-yet-viewed programs" in S1104, the program is determined as the "forgot-to-view program" in S1105. For example, if the second episode of the drama series A1 is not viewed, the second episode of the drama series A1 exists in the "not-yet-viewed programs". Therefore, the second episode of the drama series A1 is determined as the "forgot-to-view program". S1104 and S1105 are equivalent to an example of a forgot-to-view program identification step of the present invention.

On the other hand, if the "want-to-view program" is not found out in the "not-yet-viewed programs" in S1104, the control proceeds to S212, and whether there are other types of "want-to-view programs" is determined. For example, if there is Yomiuri Giants vs. Hanshin Tigers of professional baseball as another type of "want-to-view program" (S212), the control returns to S1104, and whether a "want-to-view program" of Yomiuri Giants vs. Hanshin Tigers of professional baseball exists in the "not-yet-viewed programs" is checked.

More specifically, while the program receiving apparatus with the configuration of FIG. 1 controls to determine the "not-yet-viewed program" in the "want-to-view programs" in the past predetermined period as the "forgot-to-view program", the program receiving apparatus with the configuration of FIG. 10 controls to determine the "want-to-view program" in the "not-yet-viewed programs" in the past predetermined period as the "forgot-to-view program".

As described, while the program receiving apparatus with the configuration of FIG. 10 extracts "not-yet-viewed programs" and searches whether there is a "want-to-view program" in the "not-yet-viewed programs", the program receiving apparatus with the configuration of FIG. 1 searches past "want-to-view programs" and searches whether there is a "not-yet-viewed program" in the past "want-to-view programs". However, if the type of the "want-to-view program" is successive programs such as a drama series, the "not-yet-viewed program" may not have to be extracted or searched. Describing more specifically, for example, if a record of viewing the first and second episodes of a drama series exists in the viewing history, the third episode and subsequent episodes are identified as the "want-to-view programs". Here, assuming that the remaining drama series is the "related program", if it is confirmed that the fifth episode of the drama series exists in the EPG, the third and fourth episodes are identified as the "forgot-to-view programs". Therefore, the "forgot-to-view" mark can be provided to the frame of the fifth episode of the EPG.

Figure 12:
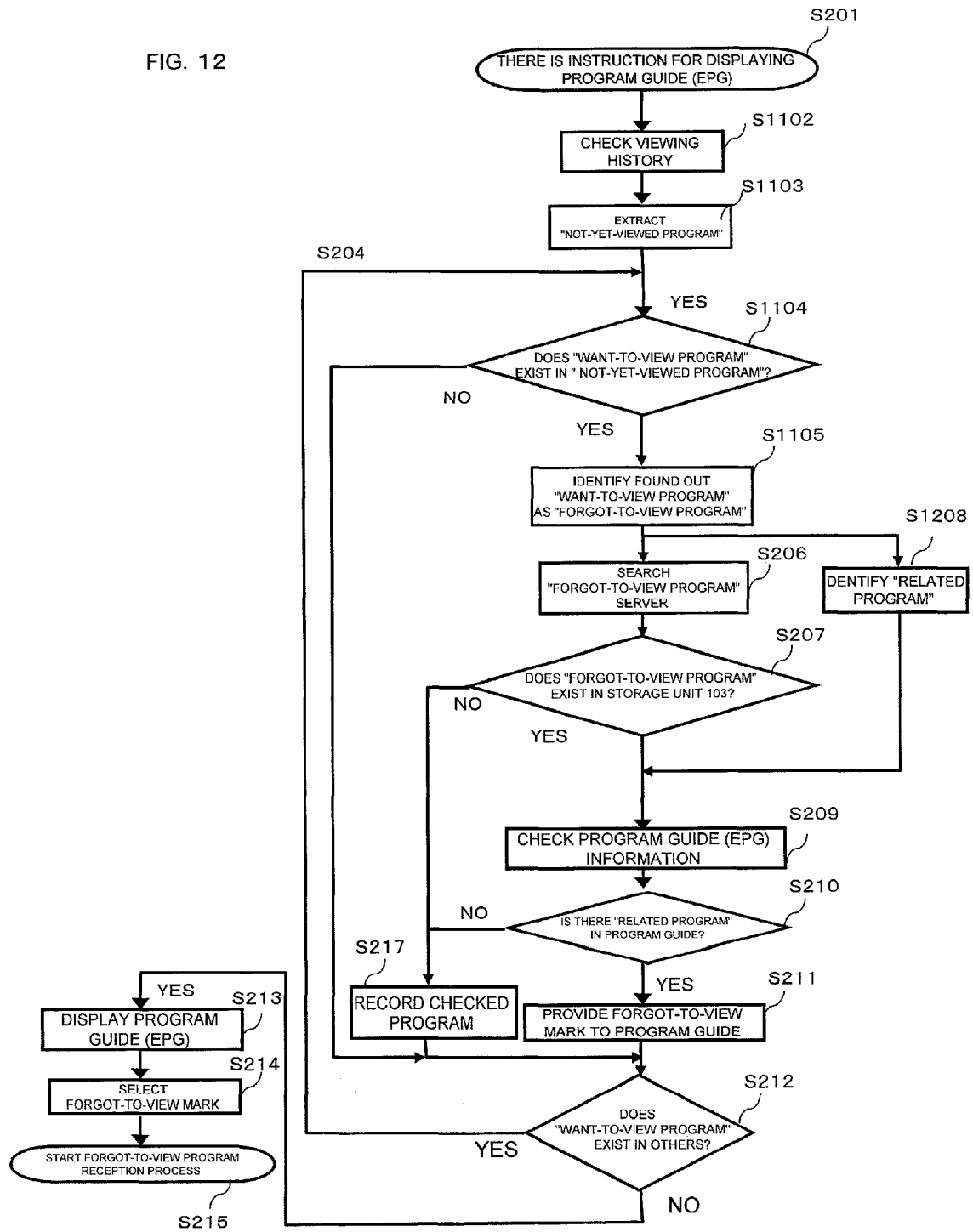
FIG. 12 is a diagram showing a modified example of the control process of the program receiving apparatus shown in FIG. 10.

Furthermore, in the first and second embodiments, although the control is performed to identify the "related program" when the "forgot-to-view program" exists in the storage unit 103, the control for identifying the "related program" may be performed in parallel with the search (S207 and S208) of whether the "forgot-to-view program" exists in the storage unit. FIG. 12 shows a flow chart of such a control as a modified example of the flow of FIG. 11.

As shown in FIG. 12, after the "want-to-view program" is identified in S1105, the "related program" is identified (S1208) in parallel with the search of whether there is a "forgot-to-view program" in the storage unit 103 (S206 and S207). In the flow of FIG. 3, the "related program" may also be identified in parallel with the search of the "forgot-to-view program".

In the first and second embodiments, the server searching instructing unit 141 of the program receiving apparatus 120 instructs the forgot-to-view program distribution system 102 for searching, and the searching unit 104 searches the storage unit 103. However, the program receiving apparatus 120 may be configured to receive stored information of the storage unit 103 from the forgot-to-view program distribution system 102 and search the stored information. In that case, the server searching instructing unit 141 serves as a searching unit that searches the storage unit 103.

In the first embodiment, the case that the "forgot-to-view" mark is simply provided to the "related program" (see FIG. 4(b)), the case that the "forgot-to-view" mark is provided to the frame of the "related program" until one day before the broadcast of the "related program" and the "forgot-to-view" mark is provided to the frame of a program earlier than the broadcasting time of the "related program" on the day of the broadcast (see FIGS. 5(a) and (b)), and the case that the "forgot-to-view" mark is provided to the frame of the "related program" until the predetermined time before the broadcast of the "related program" and the "forgot-to-view" mark is provided to the frame of a program earlier than the broadcasting time of the "related program" at the predetermined time before the broadcast have been described.

In the second embodiment, based on time, which is for the playback time of the "forgot-to-view program" earlier than the start of the broadcast of the "related program", the case that the "forgot-to-view" mark is provided to the frame of a program earlier than the broadcasting time of the "related program" before the time and the "forgot-to-view" mark is provided to the frame of the "related program" after the time (see FIGS. 7(a) and (b)), the case that the "forgot-to-view" mark is provided to a plurality of other channels (see FIG. 8), and the case that the "forgot-to-view" mark is displayed in the frame of the time display field (see FIG. 9) have been described.

In this way, although a plurality of examples for providing the "forgot-to-view" mark have been described in the first and second embodiments, the location of the "forgot-to-view" mark may be changed when the start time of the "related program" is changed. Specifically, describing with an example of an EPG 1100 as shown in FIG. 13(a), if a third episode of a drama series B1 that starts from 21 o'clock of 4ch is the "forgot-to-view program", a fourth episode of the drama B1 is the "related program". When a "forgot-to-view" mark 1101 is attached to the frame of a variety B2 which is a program before the broadcasting time of the fourth episode of the drama B1, if a baseball broadcast B3 broadcasted before the variety B2 is extended for one hour, other programs are also postponed for one hour. Therefore, as shown in an EPG 1110 of FIG. 13(b), a "forgot-to-view" mark 1111 is attached one hour later than in FIG. 13(a). An example of the location, where the mark should be displayed before the change of the present invention, is a program frame of the variety B2 before the baseball broadcasting B3 is extended (20 o'clock of 4ch). When the "forgot-to-view" mark is indicated in the frame of the "related program" as shown in FIG. 4(b), the "forgot-to-view" mark can be moved along with the movement of the "related program".

When the "forgot-to-view" mark is attached to a program which is in the same channel field as the "related program" and of which the airtime is earlier than the "related program", if the "forgot-to-view program" is not viewed until the airtime of the program attached with the "forgot-to-view" mark, the control may be performed to sequentially postpone the "forgot-to-view" mark.

Describing specifically, if a third episode of the drama B1 that starts from 21 o'clock on 4ch is the "forgot-to-view program", the "related program" is a fourth episode of the drama B1 as shown in an EPG 1200 of FIG. 14(a). In the EPG 1200, a "forgot-to-view" mark 1201 is provided to the frame of the variety B1 aired from 19 o'clock. If the "forgot-to-view program" is not viewed until 19 o'clock, a "forgot-to-view" mark 1211 is provided to the frame of the variety B2 which is the next program of the variety B1 as shown in the EPG 1210 shown in FIG. 14(b). Subsequently, if the "forgot-to-view program" is not viewed until 20 o'clock when the variety B2 starts, a "forgot-to-view" mark 1221 is provided to the frame of the fourth episode of the drama B1, which is the "related program", as in an EPG 1220 shown in FIG. 14(c).

In FIGS. 14(a) to (c), if the "forgot-to-view program" is not viewed at the start of the program to which the "forgot-to-view" mark 1201 is provided, the "forgot-to-view" mark 1201 is moved to a subsequent program frame. However, the control may be performed to move the "forgot-to-view" mark 1201 to a subsequent program frame after a predetermined time from the start of the program. The predetermined time may be set to an arbitrary time and may be set at the end time of the program.

Figure 15:
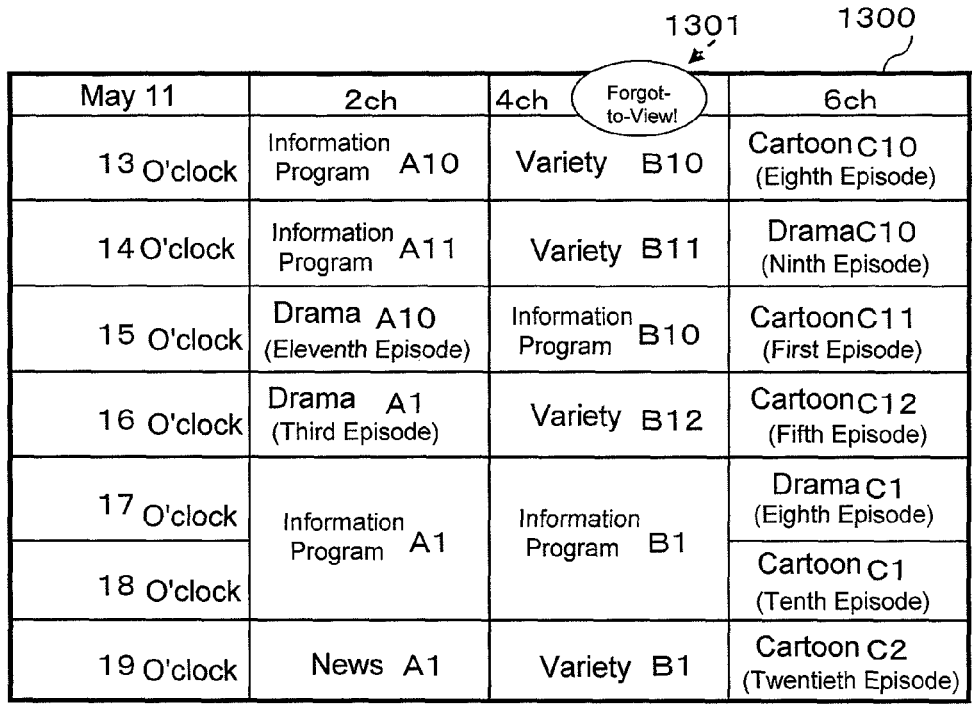
FIGS. 15(a) and (b) are diagrams showing another example of an EPG generated by the program receiving apparatus in the first and second embodiments of the present invention.
Figure 15:
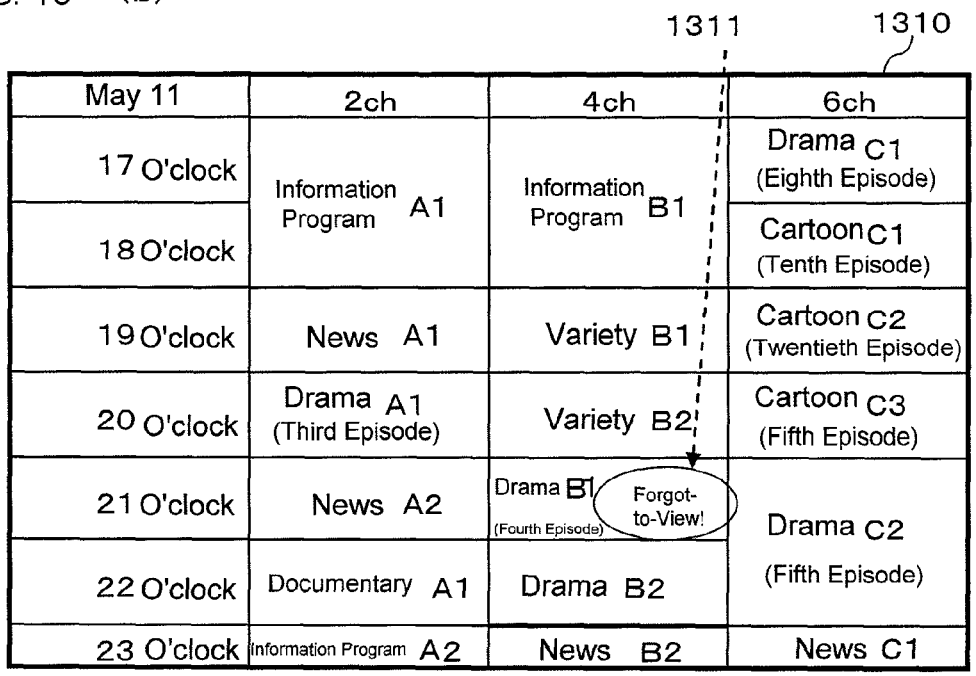

If the program for displaying the "forgot-to-view" mark has not appeared on the currently displayed EPG (state of not scrolling) in the display screen 147, the control may be performed to provide the mark to the channel frame of the channel display field. Describing with a specific example, if the third episode of the drama series B1 aired from 21 o'clock on 4ch is the "forgot-to-view program", the fourth episode of the drama B1 is identified as the "related program". As in the case described in FIG. 5, if the "forgot-to-view" mark is provided to the "related program", the program guide of 20 o'clock is not displayed as shown in FIG. 15(a) even if an EPG 1300 is displayed on the display screen 147. Therefore, unless the screen is scrolled, the user cannot visually recognize the "forgot-to-view" mark. Thus, a "forgot-to-view" mark 1301 is provided to the channel display frame in which the "related program" is aired (see FIG. 15(a)).

Then, for example, the screen is scrolled, and as shown in FIG. 15(b), a "forgot-to-view" mark 1311 is displayed in the frame of the "related program" when the program guide from 20 o'clock to 21 o'clock is displayed.

As a result of such a control, if a program in which the "forgot-to-view" mark is planned to be displayed is not currently displayed on the display screen, the user can well recognize the existence of the "forgot-to-view program" by providing the "forgot-to-view" mark in the channel program field.

When the remote control instructs displaying of the EPG, the frames of the currently broadcasted programs are displayed. Therefore, the control may be performed to display the "forgot-to-view" mark on the program frame. By the way, when the channel is changed or the broadcast moves to a program of the next time zone, the control is performed to move the "forgot-to-view" mark along with the movement of the program.

In the description of the first and second embodiments, the reception of the "forgot-to-view program" serves as an example of viewing in the present invention, and after the reception, the program guide display control unit 144 deletes the "forgot-to-view" mark from the EPG. However, the example is not limited to this. The display of the "forgot-to-view program" on the display screen 147 or finishing of the display of the "forgot-to-view program" on the display screen may serve as an example of viewing in the present invention, and the "forgot-to-view" mark may be deleted from the EPG after the display or the completion of the display.

If the user does not view the "forgot-to-view program", the control may be performed to delete the "forgot-to-view" mark from the EPG at the start of the broadcast of the program displayed with the existence of the "forgot-to-view program" or after a certain time from the start of the broadcast. For example, as shown in FIG. 5(b), the "forgot-to-view" mark is deleted from the EPG at the start of the broadcast of the news A1 broadcasted before the third episode of the drama A1 as the "related program" or after, for example, 30 minutes from the start of the broadcast.

Figure 16:
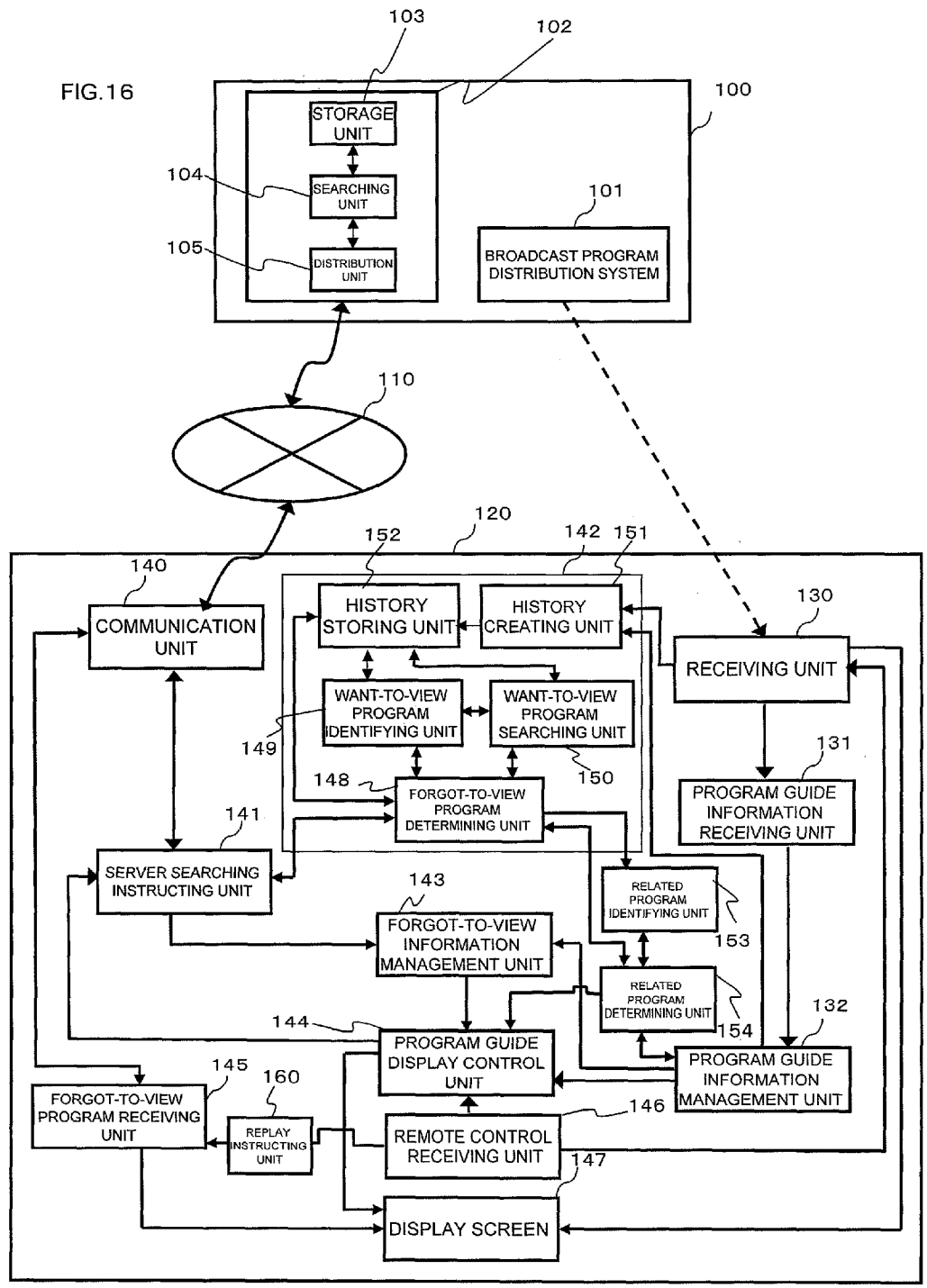
FIG. 16 is a diagram showing a configuration of another example of the program transmission/reception system in the first embodiment of the present invention.

In the first and second embodiments of the present invention, although the "forgot-to-view" mark of the EPG is selected to distribute the "forgot-to-view program" to start the display, the start timing may not be limited to immediately after the selection. A configuration of the program transmission/reception system that performs such a control is shown in FIG. 16. The program transmission/reception system shown in FIG. 16 comprises a playback instructing unit 160 that receives a signal received by the remote control receiving unit 146 to issue a reception instruction of the "forgot-to-view program" to the forgot-to-view program receiving unit 145 at predetermined timing. The playback instructing unit 160 and the forgot-to-view program receiving unit 145 are equivalent to an example of a playback unit of the present invention.

Describing specifically, for example, even if the user selects the "forgot-to-view" mark at 18 o'clock in the EPG 610 of FIG. 7(a) of the second embodiments, the playback of the "forgot-to-view program" may automatically start at the start time of the program with description of "forgot-to-view", which is 19 o'clock here. Furthermore, even if the "forgot-to-view" mark 601 is provided to the frame of the "related program" as in the EPG 600, the playback of the "forgot-to-view program" may automatically start at the time that allows continuous viewing, or 19 o'clock, if the "forgot-to-view" is selected at arbitrary timing before 19 o'clock.

As the "forgot-to-view" mark is selected, the "forgot-to-view program" may be received to start recording, or the recording may be reserved.

In the first and second embodiments, the control as shown in FIG. 3 is performed triggered by an instruction for displaying the EPG. However, S202 to S212 of FIG. 3 may be performed triggered by the reception of new EPG information transmitted from the broadcasting station 100. In this way, creating the EPG information inside the program receiving apparatus 120 without displaying the EPG on the display screen 147 can immediately display the EPG when there is a display instruction of the EPG. Obviously, the determination of not-yet-viewing is occasionally updated in sequence.

Figure 17:
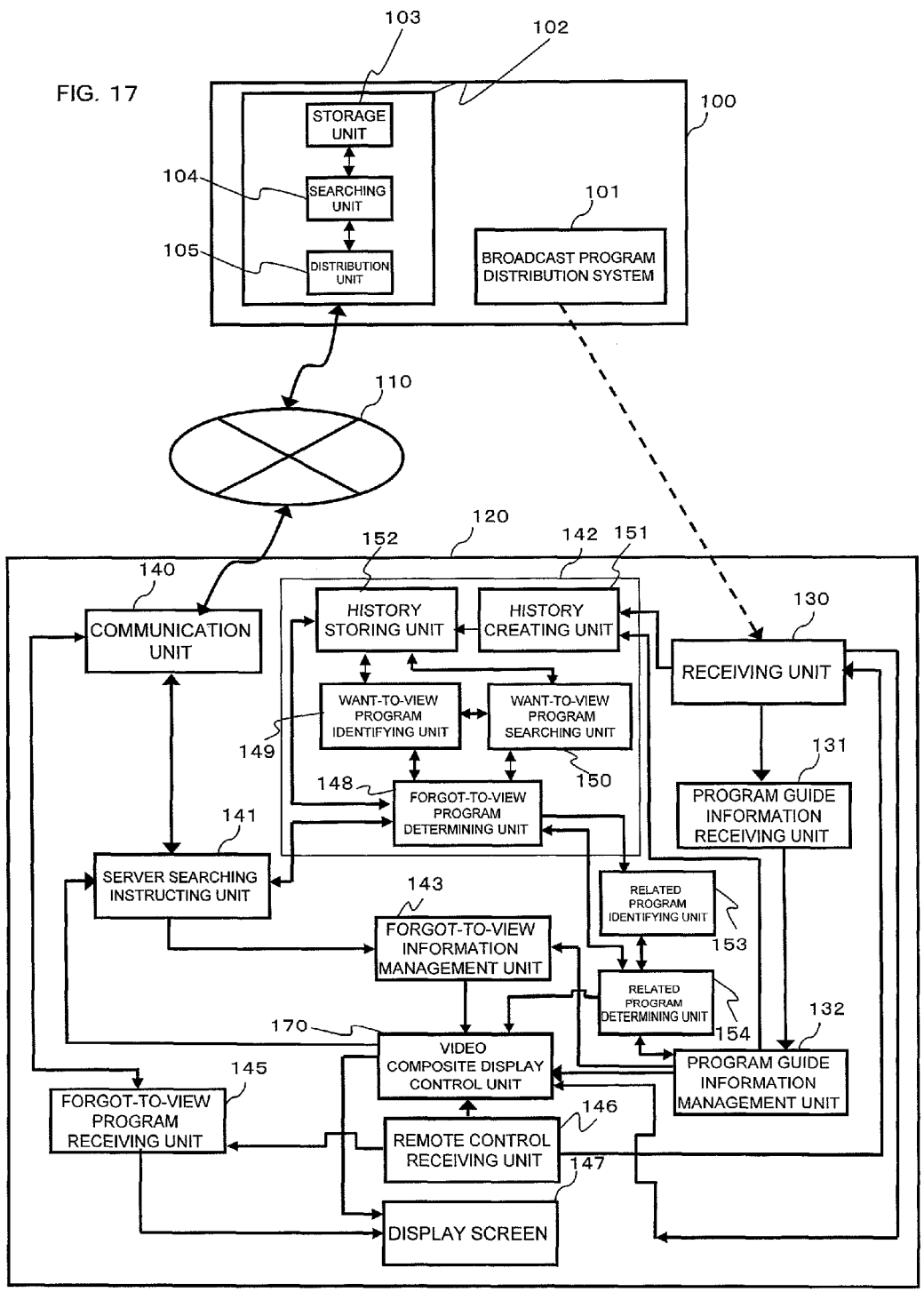
FIG. 17 is a diagram showing a configuration of another example of the program transmission/reception system in the first embodiment of the present invention.

In the first and second embodiments, although the "forgot-to-view" mark is provided to the EPG to notify the user the existence of the "forgot-to-view" mark, the existence of the "forgot-to-view program" may be displayed multiplexed with the broadcast program or on a different screen from the broadcast program. FIG. 17 is a diagram showing a configuration of the program transmission/reception system that displays the existence of the "forgot-to-view program" multiplexed with the broadcast program or on a different screen from the broadcast program. The program transmission/reception system shown in FIG. 17 comprises a video composite display control unit 170 in place of the program guide display control unit 144 described in FIG. 1. The video composite display control unit 170 is equivalent to an example of a forgot-to-view display control unit of the present invention. When information of the existence of the "forgot-to-view program" in the storage unit 103 is received from the forgot-to-view information management unit 143, and information of the existence of the "related program" in a predetermined period in the future is received from the related program determining unit 154, the video composite display control unit 170 combines the display of the existence of the "forgot-to-view program" with the broadcast received by the receiving unit 130.

In the program transmission/reception system shown in FIG. 17, the existence of the "forgot-to-view program" is displayed during the broadcast of the program. Therefore, not the instruction for displaying the EPG, but the reception of the updated EPG information is used as a trigger for executing the control process.

Figure 18:
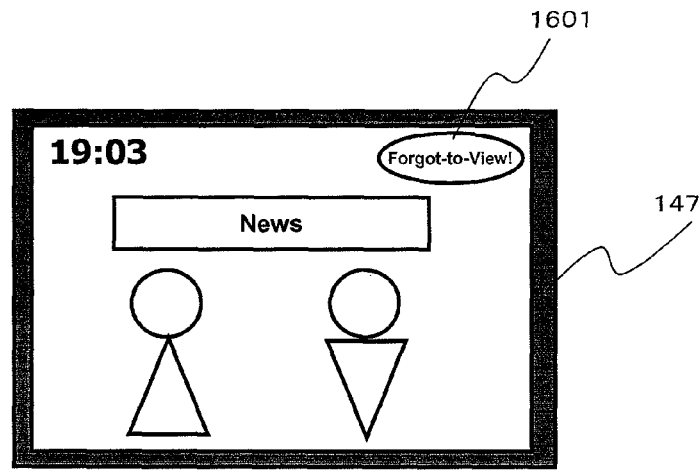
FIGS. 18(a) and (b) are diagrams showing a display screen in another example of the program transmission/reception system in the first embodiment of the present invention.
Figure 18:
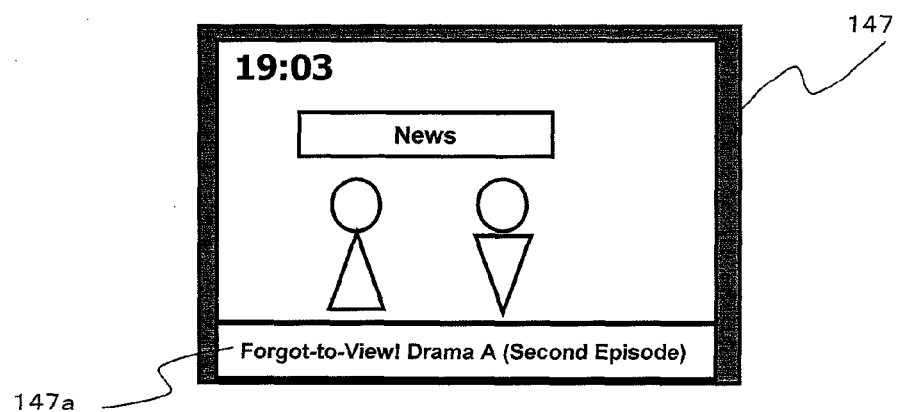
Figure 19:
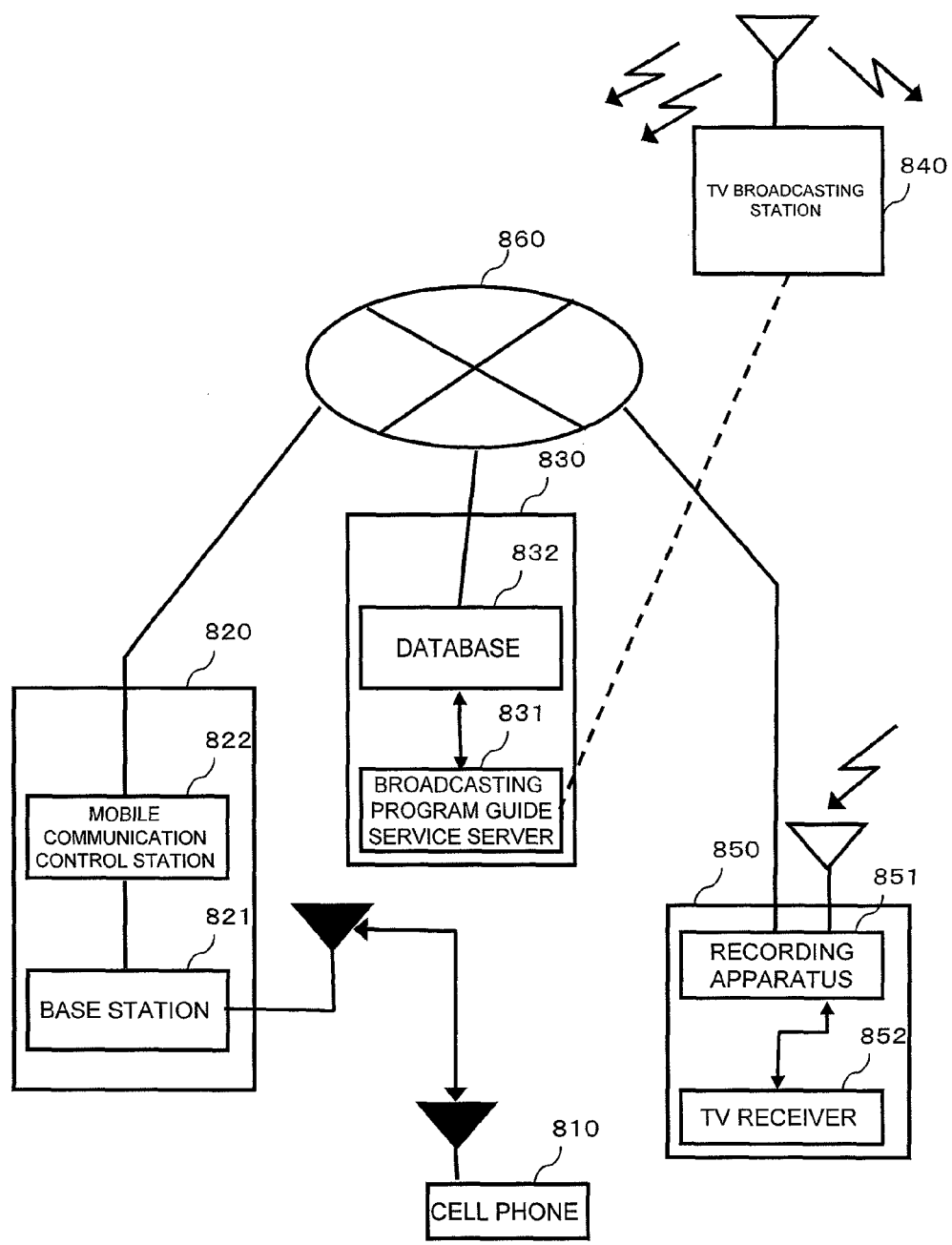
FIG. 19 is a diagram showing a conventional program reception system.

For example, if the second episode of the drama A1 from 20 o'clock on 2ch is the "forgot-to-view program", the third episode of the drama A1 shown in the EPG 300 of FIG. 4(a) is the "related program". Therefore, for example, a "forgot-to-view" mark 1601 can be displayed multiplexed with the broadcast program as shown in the display screen 147 of FIG. 18(a) during the broadcast of the news A1 aired before the "related program". As shown in the display screen 147 of FIG. 18(b), "Forgot to View! Drama Second Episode" can be described on another screen 147a below the aired program. The EPG to which the "forgot-to-view" mark is provided may be displayed in another screen.

In the first and second embodiments, although the forgot-to-view program distribution system 102 is arranged, the forgot-to-view program distribution system 102 may not be arranged if the same broadcast is repeated for a number of times as in cable TV. In such a case, the "forgot-to-view" mark that also indicates information of the plan of rebroadcasting can be provided to the "related program" or the like in the EPG. If the "forgot-to-view" mark is selected, as the rebroadcasting starts, the rebroadcasting program may be displayed, or recording of the rebroadcasting program may be reserved.

The rule for determining the "related program" related to the "forgot-to-view program" is not limited to the rule described above ("identify all programs belonging to a "want-to-view program" group, to which the "forgot-to-view program" belongs, as "related programs" of the "forgot-to-view program""). Other than the rule, a rule of also setting the recapitulation as the related program in the case of a drama series and also setting the broadcast of a fan appreciation program of Yomiuri Giants and the like as the related program in the case of Yomiuri Giants vs. Hanshin Tigers may be applied. The rule can be determined in advance in each case.

As described, the program receiving apparatus according to the present invention can indicate upon the display of an EPG that a "forgot-to-view program" related to a not-yet-viewed program exits in a distribution system and is useful, for example, in viewing a forgot-to-view program associated with broadcasting.

The program receiving apparatus according to the present invention may comprise a CPU and an input/output unit connected to the CPU and constitutes the method of realizing the operation by a program, and the CPU may interpret the program to execute the process. The program may be recorded in a computer-readable recording medium.

The program according to the present invention is a program of making a computer execute the operation of all or a part of steps of the program reception method of the present invention mentioned above, and is a program which operates in collaboration with the computer.

Moreover, the recording medium of the present invention is a recording medium which records a program for making a computer execute all or a part of operation of all or a part of steps of the program reception method of the present invention mentioned above and which is a readable by the computer, whereby the read program performs the operations in collaboration with the computer.

In addition, one utilizing form of the program of the present invention may be an aspect of being recorded on a recording medium, ROM and the like are included, which can be read by a computer, and operating with collaborating with the computer.

Moreover, one utilizing form of the program of the present invention may be an aspect of being transmitted inside a transmission medium, transmission media such as the Internet, light, radio waves, and acoustic waves and the like are included, being read by a computer, and operating with collaborating with the computer.

Furthermore, a computer according to the present invention described above is not limited to pure hardware such as a CPU and may be arranged to include firmware, an OS and, furthermore, peripheral devices.

Moreover, as described above, configurations of the present invention may either be realized through software or through hardware.

INDUSTRIAL APPLICABILITY

The program reception terminal according to the present invention have an effect that the user does not particularly have to intentionally perform searching, and the user can naturally recognize a forgot-to-view program in a daily act of viewing TV broadcasting or TV guide, and is useful in a program transmission/reception system or the like.

DESCRIPTION OF SYMBOLS 100 broadcasting station
101 broadcasting program distribution system
102 a forgot-to-view program distribution system
103 storage unit
104 searching unit
105 distribution unit
110 public line network
120 program receiving apparatus
130 receiving unit
140 communication unit
141 server searching instructing unit 142 history management unit
143 forgot-to-view information management unit
144 program guide display control unit
145 forgot-to-view program receiving unit
146 remote control receiving unit
148 forgot-to-view program determining unit
149 want-to-view program identifying unit
150 want-to-view program searching unit
151 history creating unit
152 history storing unit
160 playback instructing unit
170 video composite display control unit
301 not-yet-viewed program extracting unit
810 cell phone
820 communication provider-side apparatus
821 base station
822 mobile communication control station
830 service center
831 broadcasting program guide service server
832 database
840 TV broadcasting station
850 recording apparatus
852 TV receiver
860 Internet

The invention claimed is:

1. A program reception terminal comprising:
a receiving unit that is configured to receive broadcasted programs, the receiving unit being possessed by a user;
an electronic programming guide receiving unit that is configured to continually receive an electronic programming guide;
a history creating unit that is configured to create a viewing history of the user based on the programs received by the receiving unit possessed by the user;
a program type holding unit that is configured to hold a type of a program, which is specified based on the viewing history of the user and a predetermined rule;
a program searching unit that is configured to search an electronic programming guide of the past for one or more programs of the specified type held by the program type holding unit, the electronic programming guide of the past being received by the electronic programming guide receiving unit;
a program determining unit that is configured to determine, based on the viewing history of the user, a not-yet-viewed program from among the programs of the specified type that have been searched out by the program searching unit;
a related program judging unit that is configured to judge, based on an electronic programming guide of the future, whether a related program, which is related to the not-yet-viewed program determined by the program determining unit, exits or not, the electronic programming guide of the future being received by the electronic programming guide receiving unit; and
a display control unit that is configured to display the existence of the program.

2. The program reception terminal according to claim 1, wherein if a system that distributes programs cannot distribute the not-yet-viewed program, the display control unit does not display the existence of the related program.

3. The program reception terminal according to claim 1, wherein if the system that distributes programs cannot distribute the program of the specified type, all or part of operations of the program determining unit, the related program judging unit, and the display control unit are terminated.

4. The program reception terminal according to claim 1, wherein the related program is at least one program from among programs of the specified type to which the not-yet-viewed program belongs.

5. The program reception terminal according to claim 1, wherein the display control unit, is a video composite display control unit (i) that is configured to display the existence of the related program on a viewing screen to display the existence of die related program, or (ii) that is configured to display the existence of the related program on a screen different from the viewing screen at a predetermined time before a start or an end of the related program.

6. The program reception terminal according to claim 1, further comprising
a playback unit that is configured to playback the not-yet-viewed program at a predetermined time before a start time of the related program if a user makes a selection corresponding to display.

7. The program reception terminal according to claim 1, wherein the not-yet-viewed program is recorded if a user makes a selection corresponding to display.

8. The program reception terminal according to claim 1, wherein the display control unit is an electric programming guide display control unit is configured to display the existence of the related program on a electronic programming guide of the future when displaying the electronic programming guide of the future.

9. The program reception terminal according to claim 8, wherein the electronic programming guide display control unit displays the existence of the related program in a time display field.

10. The program reception according to claim 8, wherein when a start time of the related program is changed, the electronic programming guide display control unit moves display indicating the existence of the related program from a location for display before the change.

11. The program reception terminal according to claim 8, wherein the electronic programming guide display control unit deletes display of the existence of the related program from the electronic programming guide of the future (i) during viewing of the not-yet-viewed program, (ii) at to start of a program displayed with the existence of the related program, or (iii) after a certain time from the start of the program displayed with the existence of the related program.

12. The program reception terminal according to claim 8, wherein if the existence of the related program is not displayed in a currently displayed electronic programming guide, the electronic programming guide display control unit displays the existence of the related program in a channel display field of the currently displayed electronic programming guide.

13. The program reception terminal according to claim 8, wherein the electronic programming guide display control unit displays the existence of the related program in a program frame of a currently viewed program in the electronic programming guide of the future.

14. The program reception terminal according to claim 8, wherein the electronic programming guide display control unit displays the existence of the related program in a frame of a program field of a channel to which the related program belongs.

15. The program reception terminal according to claim 14, wherein the electronic programming guide display control unit displays the existence of the related program In a frame of the related program.

16. The program reception terminal according to claim 14, wherein the electronic programming guide display control unit displays the existence of the related program in a frame of the related, program until a predetermined time before a start of a broadcast of the related program, and displays the existence of the related program in a frame of a program, which is broadcasted before the related program, after the predetermined dote before the start of the broadcast of the related program.

17. The program reception terminal according to claim 14, further comprising
a program time management unit that is configured to manage playback time of the not-yet-viewed program,
wherein the electronic programming guide display control unit displays the existence of the related program in a frame of a program that starts at least the playback time before a start of a broadcast of the related program.

18. The program reception terminal according to claim 14, wherein the electronic programming guide display control unit displays the existence of the related program in frames of programs of a plurality of channels in a same zone of time as the related program or in frames of programs of is plurality of channels in the same zone of time as a program before the related program.

19. The program reception terminal according to claim 14, wherein when display indicating die existence of the related program is displayed in a frame of a program before the related program, the electronic programming guide display control unit sequentially moves the display indicating the existence of the related program to the following program fields up to the related program if viewing of the not-yet-viewed program is not started at a start of the program displayed with the existence of the related program or after a certain time from the start of the program.

20. The program reception terminal according to claim 16, wherein the electronic programming guide display control unit displays the existence of the related program in the frame of the related program before a broadcast starting day of the related program, and displays the existence of the related program in the frame of the program, which is broadcasted before the related program, on the broadcast starting day of the related program.

21. The program reception terminal according to claim 17, wherein if a plurality of the not-yet-viewed programs exist with respect to the related program, the program time management unit sets the total of the playback time of the plurality of not-yet-viewed programs as the playback time.

22. A program transmission/reception system comprising:
a program broadcasting station that is configured to broadcast programs;
a program reception terminal including
    a receiving unit that is configured to receive the broadcasted programs, the receiving unit being possessed by a user,
    an electronic programming guide receiving unit that is configured to continually receive an electronic programming guide,
    a history creating unit that is configured to create a viewing history of the user based on the programs received by the receiving unit possessed by the user,
    a program typo holding unit that is configured to hold a type of program, which is specified based on the viewing history of the user and a predetermined rule,
    a program searching unit that is configured to search an electronic programming guide of the past for one or more programs of the specified type held by the program type holding unit, the electronic programming guide of the past being received by the electronic programming guide receiving unit,
    a program determining unit that is configured, to determine, based on the viewing history of the user, a not-yet-viewed program from among the programs of the specified type that have been searched out by the program searching unit,
    a related program judging unit that is configured to judge, based on an electronic programming guide of the futures, whether a related program, which is related to the not-yet-viewed program determined by the program determining unit, exists or not, the electronic programming guide of the future being received by the electronic programming guide receiving unit, and
    a display control unit that is configured to display the existence of the related program; and
a program distributing apparatus including
    a storage unit that is configured to store programs,
    a searching unit that is configured to search, for the not-yet-viewed program, in the storage unit, and
    distributing unit that is configured to distribute the not-vet-viewed program, which has been searched out by the searching unit, to the program reception terminal,
wherein if the not-yet-viewed program does not exist in the storage unit, the display control unit does not display the existence of the not-yet-viewed program.

23. A program reception method comprising:
a reception step by a receiving unit that is configured to receive broadcasted programs, the receiving unit being possessed by a user;
an electronic programming guide reception step by an electronic programming guide receiving unit that is configured to continually receive an electronic programming guide;
a history creation step by a history creating unit that is configured to create a viewing history of the user based the programs received by the receiving unit possessed by the user;
a program type holding step by a program type holding unit that is configured to hold a type of a program, which is specified based on the viewing history of the user and a predetermined rule;
a program search step by a program searching unit that is configured to search an electronic programming guide of the past for one or more programs of the specified type held by the program type holding unit, the electronic programming guide of the past being received by the electronic program guide receiving unit;
a program determination step by it program determining unit that is configured to determine, based on the viewing history of the user, a not-yet-viewed program from among the programs of the specified type that have been searched out by the program searching unit;
a related program judgment step by a related program judging unit that is configured to judge, based on an electronic programming guide of the future, whether a related program, which is related to the not-yet-viewed program determined by the program determining unit, exists or not, the electronic programming guide of the future being received by the electronic programming guide receiving unit; and a display step by a display control unit that is configured to display the existence of the related program.

24. A program embodied on a non-transitory computer-readable medium, the program causing a computer to execute steps of the program reception method according to claim 23, the steps being:

a reception step 1w a receiving unit that is configured to receive broadcasted programs, the receiving unit being possessed by a user;

an electronic programming guide reception step by an electronic programming guide receiving unit that is configured to continually receive an electronic programming guide;

a history creation step by a history creating unit that is configured to create a viewing history of the user based the programs received by the receiving unit possessed by the user;

a program type holding step by a program typo holding unit that is configured to hold a type of a program, which is specified based on the viewing history of the user and a predetermined rule;

a program search step by a program searching unit that is configured to search an electronic programming of the past for one or more programs of the specified type held by the program type holding unit, the electronic programming guide of the past being received by electronic program guide receiving unit;

a program determination step by a program determining unit that is configured to determine, based on the viewing history of the user, not-yet-viewed program from among the programs of the specified type that have been searched out by the program seaching unit;

a related program judgment step by a related program judging unit that is configured to judge, based on an electronic programming guide of the future, whether a related program, which is related to the not-yet-viewed program determined by the program determinging unit, exists or not, the electronic programming guide of the future being received by the electronic programming guide receiving unit; and a display step by a display control unit that s configured to display me existence of the related program.

25. A program reception terminal, comprising:

a receiving unit that is configured to receive broadcasted programs, the receiving unit being possessed by a user;

an electronic programming guide receiving unit that is configured to continually receive an electronic programming guide;

a history creating unit that is configured to create a viewing history of the user based on the programs received by the receiving unit;

a program type holding unit that is configured to holding a type of a program, which is specified based on the viewing history of the user and a predetermined rule;

a program extracting unit that is configured to extract, based on the viewing history of the user, one or more programs of the specified type held by the program type holding unit from an electronic programming guide of the past, the electronic programming guide of the past being received by the electronic programming guide receiveing unit;

a program determining unit that is configured to determine a not-yet-viewed program from among the programs of the specified type that have been extracted by the program extracting unit;

a related program judging unit that is configured to judge, based on an electronic programming guide of the future, whether a related program, which is related to the not-yet-viewed program determined by the program determining unit, exists or not, the electronic programming guide of the future being received by the electronic programming guide receiving unit; and a display control unit that is configured to display the existence of the related program.

\* \* \* \* \*